United States Patent [19]
Hanawa et al.

[11] Patent Number: 5,450,471
[45] Date of Patent: Sep. 12, 1995

[54] MOBILE TELEPHONE UNIT WHICH COMBINES OPERATION OF A PORTABLE MOBILE TELEPHONE AND A VEHICLE TELEPHONE

[75] Inventors: Tetsuya Hanawa; Akihide Nishiyama; Hideki Kurebayashi; Kunio Watanabe; Hideharu Suzuki; Isao Fudemoto, all of Kawasaki, Japan

[73] Assignee: Fujitsu Limited, Kanagawa, Japan

[21] Appl. No.: 26,684

[22] Filed: Mar. 5, 1993

[30] Foreign Application Priority Data

Mar. 6, 1992 [JP] Japan .................................. 4-049466
Mar. 9, 1992 [JP] Japan .................................. 4-050938

[51] Int. Cl.⁶ .................................................. H04Q 7/32
[52] U.S. Cl. ........................................ 379/58; 379/61; 379/454
[58] Field of Search ............... 379/56, 58, 61, 454, 379/59, 63, 57; 358/404; 370/100.1

[56] References Cited

U.S. PATENT DOCUMENTS

| | | | |
|---|---|---|---|
| 4,636,741 | 1/1987 | Mitzlaff | 330/127 |
| 4,659,878 | 4/1987 | Dinkins | 379/61 |
| 4,677,653 | 6/1987 | Weiner et al. | 379/58 |
| 4,850,006 | 7/1989 | Sasaki et al. | 379/58 |
| 4,916,729 | 4/1990 | Usui | 379/61 |
| 5,020,090 | 5/1991 | Morris | 379/58 |
| 5,029,233 | 7/1991 | Metroka | 455/11 |
| 5,062,132 | 10/1991 | Yasuda et al. | 379/61 |
| 5,142,573 | 8/1992 | Umezawa | 379/454 |
| 5,259,018 | 11/1993 | Grimmett et al. | 379/58 |

FOREIGN PATENT DOCUMENTS

| | | |
|---|---|---|
| 0310876 | 4/1989 | European Pat. Off. . |
| 0378450 | 7/1990 | European Pat. Off. . |
| 9108310 | 10/1991 | Germany . |
| 63-501258 | 5/1988 | Japan . |
| 1-503271 | 11/1989 | Japan . |
| 3-109829 | 5/1991 | Japan . |
| 4-192820 | 7/1992 | Japan . |
| 2248364 | 1/1992 | United Kingdom ........... 379/58 |

OTHER PUBLICATIONS

Lee, "Mobile Cellular Telecommunications Systems", 1989 p. 42.

Primary Examiner—Curtis Kuntz
Assistant Examiner—William Cumming
Attorney, Agent, or Firm—Staas & Halsey

[57] ABSTRACT

A mobile telephone unit which combines operation of a respective portable mobile telephone and a communication unit. The mobile telephone unit includes at least one portable telephone, a communication unit and a buffer unit. The communication unit includes an external connection terminal, a radio transmitter/receiver, a baseband processor, a communication controller and a handset. The buffer unit mounts at least one portable mobile telephone. The buffer unit includes a first buffer unit connector which is connectable to the external connection terminal of the communication unit, a second buffer connector which connects to a connector of a respective portable mobile telephone mounted on the buffer unit, an identifying mechanism for identifying the communication conditions of a respective portable mobile telephone mounted on the buffer unit, and a control signal transmitting mechanism for transmitting the communication conditions identified by the identifying mechanism to the communication controller of the communication unit. The communication controller is responsive to the transmitted communication conditions and adjusts the communication conditions of the communication unit so that a respective portable mobile telephone mounted on the buffer unit can communicate through the communication unit.

9 Claims, 17 Drawing Sheets

MOBILE TELEPHONE UNIT WHICH COMBINES OPERATION OF A PORTABLE MOBILE TELEPHONE AND A VEHICLE TELEPHONE

BACKGROUND OF THE INVENTION

The present invention generally relates to mobile telephone units, and more particularly to a mobile telephone unit which enables connection of a portable mobile telephone and an automobile telephone.

The services of portable mobile telephones and automobile telephones are expanding, and the number of subscribers are increasing with this expansion. The portable mobile telephone is convenient to carry around because it is light. However, the portable mobile telephone uses an antenna with a relatively small gain and a transmission output of the portable mobile telephone is relatively small, thereby restricting the environment in which the portable mobile telephone can make a call. On the other hand, the automobile telephone can use an antenna with a relatively large gain, but the automobile telephone is heavy and is unsuited to carry around. Accordingly, there are demands to provide the advantageous features of both the portable mobile telephone and the automobile telephone into a single mobile telephone.

FIG.1 is a system block diagram for explaining an example of a conventional automobile telephone system and portable mobile telephone system. In FIG. 1, at least one of the communications company, the connecting conditions and the radio frequencies differs between two mobile communication networks 50 and 60.

The communication network 50 includes a mobile communication switching center 51 which is coupled to a public network 57, and a plurality of base stations 52-1 through 52-n which are coupled to the switching center 51 and respectively have antennas 53-1 through 53-n. In this case, portable mobile telephones 54 and 55 and an automobile telephone 56 are located in the area of the communication network 50.

On the other hand, the communication network 60 includes a mobile communication switching center 61 which is coupled to the public network 57, and a plurality of base stations 62-1 through 62-m which are coupled to the switching center 61 and respectively have antennas 63-1 through 63-m. In this case, portable telephones 64 and 65 and an automobile telephone 66 are located in the area of the communication network 60.

Telephone sets 58 and 59 of general subscribers are also coupled to the public network 57.

The portable mobile telephones 54 and 55 and the automobile telephone 56 make transmission and reception between the base stations 52-1 through 52-n. Similarly, the portable mobile telephones 64 and 65 and the automobile telephone 66 make transmission and reception between the base stations 62-1 through 62-m. FIG. 1 shows a case where the user of the portable telephone 55 rides in an automobile and uses the antenna or the like of the automobile telephone 56, and the user of the portable telephone 65 rides in an automobile and uses the antenna or the like of the automobile telephone 66.

When one of the portable telephones 54, 55, 64 and 65 and the automobile telephones 56 and 66 makes a call out, the subscriber's number of the caller is transmitted via the control channel together with the subscriber's number of the called end which is dialed. On the other hand, the call out from the base station is also detected by identifying the subscriber's number which is transmitted via the control channel.

For example, when a call out is made from the portable telephone 54 by dialing the subscriber's number of the general subscriber telephone 58, a call signal is transmitted to the general subscriber telephone 54 via the base station 52-1, the switching center 51 and a switching center of the public network 57. When the called subscriber answers to the call, a speech channel is specified by the switching center 51 or the base station 52-1, and the portable telephone 54 can make the call via this specified speech channel. In this case, if the connecting conditions, the radio frequencies and the like differ between the communication networks 50 and 60, the portable telephone 54 may not be able to connect to one of the base stations 62-1 through 62-m of the communication network 60.

In the automobile telephone system, an automobile telephone which is removable from the automobile when getting off the automobile has been proposed. According to this proposal, the automobile telephone can be used as a portable telephone by connecting a battery thereto. On the other hand, in the portable mobile telephone system, various technical improvements have been made to reduce the size, weight and power consumption of the portable telephone. As a result, a pocket-sized portable telephone has been developed.

In addition, the automobile telephones 56 and 66 use the battery of the automobile as the power unit, that is, a battery which has a relatively large capacity. The automobile telephones 56 and 66 use an antenna which has a relatively large gain and is designed for use on an automobile, so as to make the transmission and reception with one of the base stations 52-1 through 52-n and 62-1 through 62-m. Hence, the radio frequency used by the automobile telephones 56 and 66 is in the 800 MHz band, and the transmission output is approximately 5 W.

On the other hand, the portable telephones 55 and 65 use a compact secondary or primary battery as the power unit. The portable telephones 55 and 65 use an antenna which has a relatively small gain, such as an inverted F-type antenna and a whip antenna, so as to make the transmission and reception with one of the base stations 52-1 through 52-n and 62-1 through 62-m. Hence, the transmission output of the portable telephones 54 and 64 is approximately 1 W or less.

The portable telephone of the type described above may be carried when riding the automobile, and an adapter for connecting the portable telephone to the automobile telephone has been proposed. Such a connection is shown in FIG. 1 as a connection of the portable telephone 55 and the automobile telephone 56 and a connection of the portable telephone 65 and the automobile telephone 66. The proposed adapter connects the portable telephone to the automobile antenna which has the larger gain than that of the portable telephone, and also connects the portable telephone to the battery of the automobile having the larger capacity than that of the portable telephone. There has also been a proposal to connect the portable telephone to the automobile telephone via the adapter such as a cable so that a radio transmitter/receiver part of the automobile telephone can be utilized by the portable telephone.

Furthermore, there are many communications companies providing the portable telephone services. As a result the connecting conditions between the base station and the portable telephone, the radio frequencies and the like differ among the different communications companies. Thus, if a subscriber subscribes to one communications company, this subscriber can connect and communicate via the base station of this one communications company but cannot connect to the base stations of other communications companies. In addition, even in the case of the same communications company, the radio frequency band may be insufficient and different radio frequency bands may be used depending on the service area. Moreover, the communication system may be different among the communications companies, that is, one communications company may employ an analog system and another communications company may employ a digital system.

The size of the portable telephone is still decreasing with the technological improvements, and portable telephones of various shapes are being put on the market. For this reason, when the user carries the portable telephone when riding the automobile, the adapter for enabling the use of the automobile antenna, the radio transmitter/receiver part or the like of the automobile telephone may not be connectable to the portable telephone due to different specifications of the adapter and the portable telephone.

On the other hand, if the communications company providing the portable mobile telephone service and the communications company providing the automobile telephone service differ, there is a problem in that the portable telephone cannot use the radio transmitter/receiver part of the automobile telephone. In addition, even if the same communications company provides the portable mobile telephone service and the automobile telephone service, the portable telephone cannot use the radio transmitter/receiver part of the automobile telephone if the radio frequency bands used by the portable telephone and the automobile telephone differ.

In addition, if two or more people carry their portable telephones when riding the same automobile, the proposed adapter can only connect one of the portable telephones to the automobile telephone. The connection of the other portable telephones to the automobile telephone must wait until the call using the connected portable telephone is finished. After the call is finished, the user must perform the troublesome operation of disconnecting the connected portable telephone from the adapter and then connecting another portable telephone to the adapter. Therefore, there was a problem in that a satisfactory service cannot be provided if two or more people carry their portable telephones when riding in the same automobile or a bus mounted with the automobile telephone.

On the other hand, the automobile telephone which has a man-machine interface fixed to the automobile and the portable telephone which has a built-in man-machine interface and communication controller may use approximately the same radio frequency bands and line structures. In this case, the portable telephone can be connected to the automobile telephone to use the transmitter/receiver part and the antenna of the automobile telephone, so that a satisfactory call can be made even in a region on the periphery of the service area of the portable telephone. But there are demands to use the portable telephone by itself when away from the automobile and to use the portable telephone as an automobile telephone when within the automobile. For this reason, it is necessary to develop a standardized operating method and functions between the portable telephone and the automobile telephone.

In addition, the portable telephone is often provided with a function of storing various data such as telephone numbers and names. In such a case, it must be made possible to read and write the data regardless of whether the portable telephone is used by itself or connected to the automobile telephone and used within the automobile.

Furthermore, the automobile telephone system and the portable telephone system are provided by a plurality of communications companies that compete in the service and price, so that services employing different systems are receivable in the same region. For this reason, the effective system depends on the region in which the service is received, the region of the destination, the time for which the service is received and the like. Accordingly, if the portable telephone and the automobile telephone which are connected subscribe to different systems, it becomes necessary to selectively employ one of the two systems when making the call. Moreover, even if the service areas of the two systems differ, it must be possible to select the system which is providing the service in the region in which the portable telephone or automobile telephone is to be used.

FIG. 2 shows an example of a conventional mobile telephone unit. In FIG. 2, a portable telephone 100 includes a man-machine interface and a communication controller. The man-machine interface includes a microphone 111, a speaker 112, a display 113, a keyboard 114, and a central processing unit (CPU) 115 which controls the display 113 and the keyboard 114. The communication controller includes a CPU 101, a read only memory (ROM) 102 which prestores programs for executing software operations of the CPU 101, a random access memory (RAM) 103 for writing and reading data which are used for the control, and a programmable ROM 104 such as an electrically erasable programmable ROM (EEPROM) which prestores non-volatile information such as dialing numbers and identification (ID) information.

A switch 116 is provided between the man-machine interface and the communication controller of the portable telephone 100. The man-machine interface and the communication controller are connected when the switch 116 is connected to a terminal A, and. information can be exchanged in this case. The data from the CPU 101 and an audio signal from the microphone 111 are modulated by being passed through a baseband circuit 105 and a transmitter/receiver 106, and are transmitted to a base station (not shown) via an antenna 107. On the other hand, a radio signal from the base station is received by the transmitter/receiver 106 via the antenna 107 and is demodulated by being passed through the baseband circuit 105. Hence, the received audio signal is supplied to the speaker 112 via the switch 116, and the received data is supplied to the CPU 101.

On the other hand, an automobile telephone 200 includes a communication controller, a transmitter/receiver 206 and an antenna 207 which are fixedly provided on an automobile (not shown). The communication controller includes a CPU 210, a ROM 202 and a RAM 203. A handset 220 is connected to the communication controller via a signal interface. The handset 220 includes a microphone 211, a speaker 212, a display 213, a keyboard 214 and a CPU 215, similarly to the man-machine interface of the portable telephone 100. The microphone 211 is used to input the voice which is to be transmitted, and the speaker 212 is used to output the received voice. The display 213 displays the input from the keyboard 214, information related to the received data and the like.

According to this mobile telephone unit shown in FIG. 2, the CPU 201 and the baseband circuit 205 within the automobile telephone 200 and the CPU 101 and the baseband circuit 105 within the portable telephone 100 can be switched and connected to the man-machine interface (111–115) of the portable telephone 100 via the switch 116. Hence, when connecting the portable telephone 100 and the automobile telephone 200, the switch 116 is connected to a terminal B, so that the man-machine interface (111–115) of the portable telephone 100 is connected to the automobile telephone 200.

The control functions of the CPU 101 within the portable telephone 100 include a man-machine interface task (MMI TASK) 301 and a communication task 302 as shown in FIG. 3. The CPU 115 includes a display-keyboard control function 304. The exchange of information between the control functions of the CPU 100 and the display-keyboard control function 304 of the CPU 115 is prescribed as an interface 303. On the other hand, the control functions of the CPU 201 within the automobile telephone 200 includes a man-machine interface task 401 and a communication task 402 as shown in FIG. 3. In addition, the CPU 215 of the handset 220 includes a display-keyboard control function 404.

When connecting the portable telephone 100 and the automobile telephone 200, the switch 116 is connected to the terminal B. Hence, the exchange of information between the display-keyboard control function 304 of the CPU 115 within the portable telephone 100 and the man-machine interface task 401 within the automobile telephone 200 is made via an interface 403 as shown in FIG. 3. In other words, the portable telephone 100 is used in place of the handset 220, and the man-machine interface task 401 and the communication task 402 are carried out by the automobile telephone 200.

FIG. 4 shows another example of a conventional mobile telephone unit. In FIG. 4, those parts which are the same as those corresponding parts in FIG. 2 are designated by the same reference numerals, and a description thereof will be omitted.

In FIG. 4, the transmitter/receiver 106 of a portable telephone 500 includes a modulator 501, a transmitting amplifier 502, a transmitter/receiver duplexer 503, a receiving amplifier 504 and a demodulator 505. A dependent contact of the transmitter/receiver duplexer 503 is connected to a movable contact of a switch 506. A terminal A of the switch 506 is connected to the antenna 107, and a terminal B of this switch 506 is connected to a radio frequency (RF) interface 510.

On the other hand, an automobile telephone 600 at least includes a transmitter/receiver duplexer 601, a transmitting amplifier 602, a transmitter/receiver duplexer 603, an antenna 604, and a receiving amplifier 605. A dependent contact of the transmitter/receiver duplexer 601 is connected to the RF interface 510.

When the portable telephone 500 and the automobile telephone 600 are connected and used, the switch 506 is connected to the terminal B, and the transmitter/receiver duplexers 503 and 601 are connected via the RF interface 510 and the switch 506. Hence, at the time of the transmission, the data and audio signal from the baseband circuit 105 of the portable telephone 500 are modulated by the modulator 501 and amplified by the transmitting amplifier 502. The amplified data and audio signal are thereafter passed through the transmitter/receiver duplexer 503, the switch 506, the RF interface 510, the transmitter/receiver duplexer 601, the transmitting amplifier 602 and the transmitter/receiver duplexer 603, and are transmitted by radio from the antenna 604 of the automobile telephone 600 to the base station (not shown).

On the other hand, the signal received from the base station is received by the transmitter/receiver duplexer 603 via the antenna 604 of the automobile telephone 600. The received signal is amplified by the receiving amplifier 605, and is input to the portable telephone 500 via the transmitter/receiver duplexer 601 and the RF interface 510. This received signal is demodulated via the switch 506, the transmitter/receiver duplexer 503, the receiving amplifier 504 and the demodulator 505, and is then supplied to the baseband circuit 105. Hence, the received audio signal is supplied to the speaker 112, and the received data is supplied to the CPU 115 via the CPU 101.

Accordingly, according to this conventional mobile telephone unit shown in FIG. 4, when using the portable telephone 500 and the automobile telephone 600 in the connected state, the portable telephone 500 includes the man-machine interface task 301 and the communication function 302 of the CPU 101, and the display-keyboard control function 304 of the CPU 115, as shown in FIG. 5. On the other hand, the automobile telephone 600 is used as a booster which only has the function of amplifying the transmitting signal and the received signal, and the high-frequency signals are exchanged via the RF interface 510.

Therefore, according to the conventional mobile telephone unit shown in FIG. 2, even if the portable telephone 100 and the automobile telephone 200 are connected, the automobile telephone 200 must be provided with the man-machine interface task 401 which matches the man-machine interface task 301 of the portable telephone 100 which has various man-machine interface functions depending on each user, in order to standardize the operating method and functions between the case where the portable telephone 100 is used by itself and the case where the portable telephone 100 is connected to the automobile telephone 200 and used.

In addition, although the database such as the names and telephone numbers are provided within the portable telephone 100, the man-machine interface task 401 with respect to the key input is carried out in the automobile telephone 200. For this reason, the data transfer must be made from the automobile telephone 200 to the portable telephone 100 when writing data and the data transfer must be made from the portable telephone 100 to the automobile telephone 200 when reading data, thereby slowing down the response speed of the mobile telephone unit when making access to the database.

On the other hand, according to the conventional mobile telephone unit shown in FIG. 4, the call can only be made with the system to which the portable telephone 500 is subscribed, because the modem methods and the communication control methods differ among the systems. In order to enable the call to both the subscribed system of the portable telephone 500 and the subscribed system of the automobile telephone 600, the communication controller, the modulator and the demodulator must be designed to conform to the two different systems. As a result, even if a part of the circuitry is used in common between the two systems, it is still necessary to provide two independent circuit systems for a majority of parts of the communication controller, the modulator and the demodulator. In other words, the circuit construction becomes complex, and the cost of the unit becomes high. Furthermore, the software of the communication control function must be provided independently for the two systems.

SUMMARY OF THE INVENTION

Accordingly, it is a general object of the present invention to provide a novel and useful mobile telephone unit in which the problems described above are eliminated.

Another and more specific object of the present invention is to provide a mobile telephone unit comprising at least one portable mobile telephone having a first connector, a communication unit body including at least an external connection terminal part, a radio transmitter/receiver, a baseband processor, a communication control part and a handset part, and a buffer unit having a second connector which is connectable to the external connection terminal part of the communication unit body, a third connector which is connectable to the first connector of the portable mobile telephone which is mounted on the buffer unit, identifying means for identifying communication conditions of the portable mobile telephone which is mounted on the buffer unit, and control signal transmitting means for notifying the communication conditions identified by the identifying means to the communication control part of the communication unit body, so that the communication control part of communication unit body changes or converts the communication conditions responsive to the notified communication conditions. According to the mobile telephone unit of the present invention, the portable mobile telephone can communicate using the communication functions of the communication unit body. In addition, it is possible to connect the portable mobile telephone to the communication unit body via the buffer unit, without having to modify the structure of the communication unit body. Furthermore, it is possible to connect a plurality of portable mobile telephones to the communication unit body via the buffer unit, even if the shapes of the portable mobile telephones are different.

Still another object of the present invention is to provide a mobile telephone unit comprising at least one portable mobile telephone including a first communication control function for making a radio communication with a base station, and a man-machine interface function related to operation and display, an automobile telephone including a second communication control function for making a radio communication with a base station, and first interface means for exchanging information between the man-machine interface function of the portable mobile telephone and the communication control function of the automobile telephone. According to the mobile telephone unit of the present invention, the same functions and operating methods of the portable mobile telephone can be used even when the portable mobile telephone is coupled to the automobile telephone, and the specifications of the portable mobile telephone does not necessarily have to match the specifications of the automobile telephone. In other words, portable mobile telephones having various specifications can be coupled to one kind of automobile telephone.

A further object of the present invention is to provide a mobile telephone unit comprising a portable mobile telephone capable of communicating with a first communication system, an automobile telephone including control circuit means and modem circuit means for communicating with a second communication system which is different from the first communication system, and transmitter/receiver circuit means for communicating with either one of the first and second communication systems, signal line interface means for exchanging data and audio signals between the portable mobile telephone and the control circuit means and the modem circuit means of the automobile telephone, and radio frequency interface means for exchanging high-frequency signals between the portable mobile telephone and the transmitter/receiver circuit means of the automobile telephone. According to the mobile telephone unit of the present invention, it is possible to selectively communicate with either the first communication system or the second communication system in a state where the portable mobile telephone is coupled to the automobile telephone.

Other objects and further features of the present invention will be apparent from the following detailed description when read in conjunction with the accompanying drawings.

DESCRIPTION OF THE PREFERRED EMBODIMENTS

First, a description will be given of the operating principle of one aspect of the present invention, by referring to FIG. 6.

Figure 6:
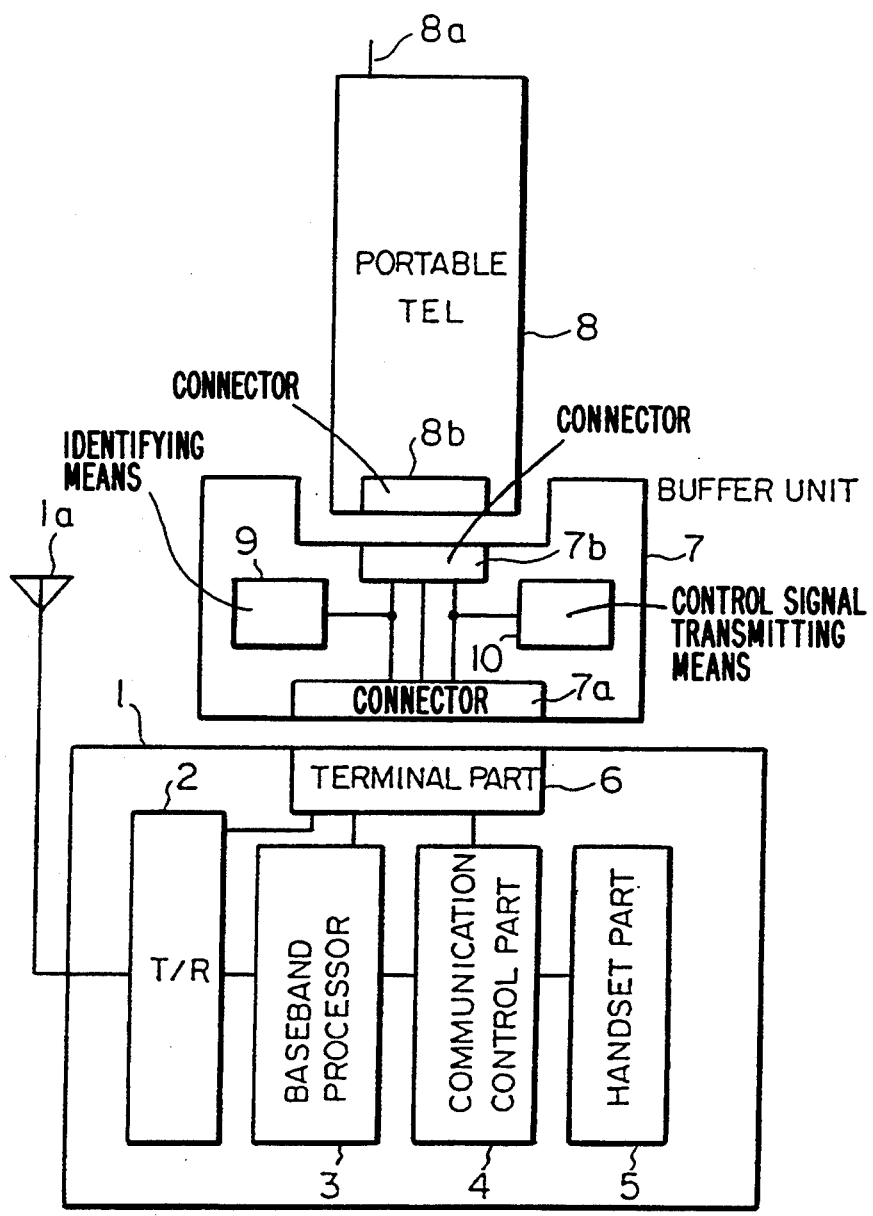
FIG. 6 is a system block diagram for explaining the operating principle of one aspect of the present invention.

A communication unit body 1 shown in FIG. 6 includes at least a radio transmitter/receiver 2 which is connected to an antenna 1a, a baseband processor 3, a communication control part 4, a handset part 5, and an external connection terminal part 6. In other words, the communication unit body 1 forms an automobile telephone. On the other hand, a buffer unit 7 has a construction which enables connection of a portable telephone 8 to the external connection terminal part 6 of the communication unit body 1.

The buffer unit 7 includes an identifying means 9 for identifying communication conditions of the portable telephone 8, and a control signal transmitting means 10 for notifying an identification result of the identifying means 9 to the communication unit body 1, and for switching the radio frequency, the service conditions and the like. The construction of the buffer unit 7 enables connection of a plurality of portable telephones 8 to the communication unit body 1 via the buffer unit 7.

When the user carries the portable telephone 8 when riding the automobile in which the communication unit body 1 is mounted, a connector 7a of the buffer unit 7 having a shape corresponding to that of the portable telephone 8 is connected to the external connection terminal part 6 of the communication unit body 1, and a connector 8b of the portable telephone 8 is connected to a connector 7b of the buffer unit 7. The portable telephone 8 includes an antenna 8a. The portable telephone 8 and the communication unit body 1 are connected via the buffer unit 7 by the above described connections, and it becomes possible to communicate from the portable telephone 8 via the functions of the communication unit body 1 such as the antenna 1a and the radio transmitter/receiver 2.

It is possible to provide a plurality of kinds of buffer units 7 conforming to the various shapes of the portable telephones 8. Alternatively, it is possible to standardize the connectors 7b and 8b, so that various kinds of portable telephones 8 can be connected to the buffer unit 7 by absorbing the difference in the shapes of the portable telephones 8 by a resilient holding mechanism.

The identifying means 9 of the buffer unit 7 identifies the communication conditions such as the radio frequency and the control channel for the connection, and also identifies the subscriber's number and the like. The communication conditions and the subscriber's number identified by the identifying means 9 are transmitted to the communication unit body 1 via the control signal transmitting means 10. The communication control part 4 of the communication unit body 1 changes the communication conditions to those conforming to the communication conditions of the portable telephone 8 or, converts the communication conditions. Accordingly, it is possible to use the portable telephone 8 as an automobile telephone. In this case, the communication is made using the subscriber's number of the portable telephone 8, so that the accounting is made to the subscriber of the portable telephone 8. On the other hand, if the communication is made using the subscriber's number of the automobile telephone, that is, the communication unit body 1, the accounting is made to the subscriber of the automobile telephone.

Because a plurality of portable telephones 8 can be connected to the communication unit body 1 via the buffer unit 7, it is possible to use any of the connected portable telephones 8 as the automobile telephone without having to disconnect one portable telephone and connect another portable telephone with respect to an adapter as in the conventional case.

Next, a description will be given of a first embodiment of a mobile telephone unit according to the present invention, by referring to FIG. 7.

Figure 7:
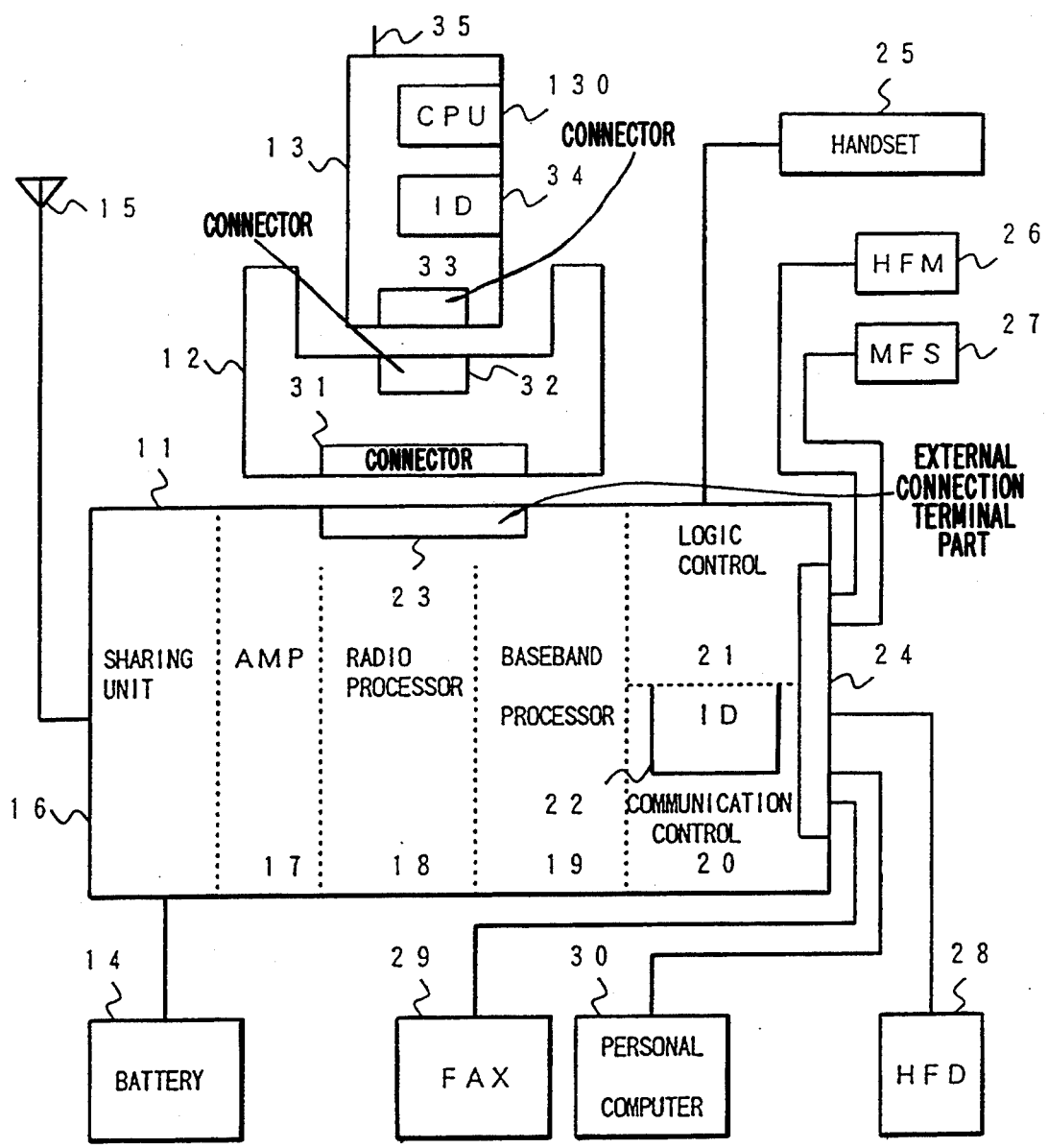
FIG. 7 is a system block diagram showing a first embodiment of a mobile telephone unit according to the present invention.

In FIG. 7, a mobile telephone unit generally includes a communication unit body 11, a buffer unit 12 and a portable telephone 13. The communication unit body 11 is connected to a battery 14, an antenna 15, a handset 25, a hands-free microphone (HFM) 26, a hands-free speaker (HFS) 27, a hands-free dial (HFD) 28, a facsimile machine 29 and a personal computer 30.

The communication unit body 11 includes a connector 24, a shared transmitter/receiver branching filter 16, a transmitter/receiver amplifier 17, a radio processor 18, a baseband processor 19, a communication controller 20, a logic controller 21, a subscriber's number storage 22, and an external connection terminal part 23.

The buffer unit 12 includes connectors 31 and 32. In addition, the portable telephone 13 includes a connector 33, an subscriber's number storage 34, an antenna 35 and a CPU 130. The CPU 130 controls various functions of the portable telephone 13.

In the communication unit body 11, the shared transmitter/receiver branching filter 16, the amplifier 17 and the radio processor 18 form the radio transmitter/receiver 2 shown in FIG. 6. The baseband processor 19 corresponds to the baseband processor 3 shown in FIG. 6. The communication controller 20, the logic controller 21 and the subscriber's number storage 22 form the communication control part 4 shown in FIG. 6. Furthermore, the handset 25, the hands-free microphone 26, the hands-free speaker 27 and the hands-free dial 28 form the handset part 5 shown in FIG. 6.

The communication unit body 11 operates by the power supplied from the battery 14 of the automobile. The external connection terminal part 23 includes power terminals for supplying power from the battery 14 to the buffer unit 12 and to the portable telephone 13 via the buffer unit 12, high-frequency or low-frequency signal terminals, and various control signal terminals. The high-frequency signal terminals are connected to the radio processor 18 or the amplifier 17 via a switching circuit (not shown), and the low-frequency signal terminals are connected to the baseband processor 19 or the communication controller 20 via the switching circuit. The various control signal terminals are connected to the communication controller 20 and the logic controller 21.

The facsimile machine 29 is connected to the connector 24 of the communication unit body 11, so that a facsimile communication can be made between the facsimile machine 29 and a facsimile machine (not shown) which is connected to the public network (not shown). In addition, the personal computer 30 is connected to the connector 24 of the communication unit body 11, so that a data communication can be made between the personal computer 30 and a personal computer (not shown) or a data center (not shown) which is connected to the public network. For example, it is possible to display various information such as traffic information using a display (not shown) of the personal computer 30.

In the buffer unit 12, the connector 31 is connectable to the external connection terminal part 23 of the communication unit body 11, and the connector 32 is connectable to the connector 33 of the portable telephone 13. The buffer unit 12 has a holding mechanism which has a shape corresponding to that of the portable telephone 13 so that the holding mechanism can hold the portable telephone 13 mounted thereon. If the connector 33 is standardized, it is possible to provide a resilient holding mechanism which absorbs the difference in the shapes of the various portable telephones 13. In this case, it is unnecessary to design one buffer unit 12 for each shape of the portable telephone 13. In other words, the portable telephones 13 of various shapes can be mounted on one or a plurality of kinds of buffer units 12.

Figure 8:
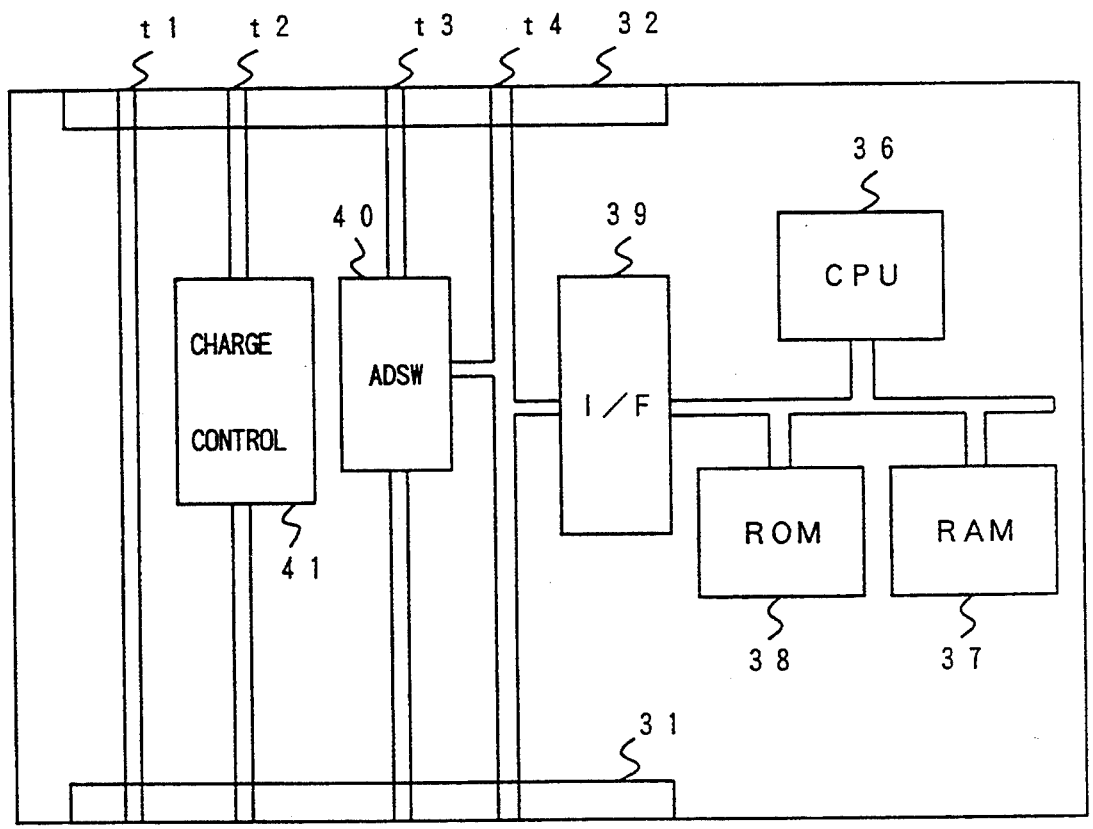
FIG. 8 is a system block diagram showing an embodiment of a buffer unit shown in FIG. 7.

FIG. 8 shows an embodiment of the buffer unit 12. The buffer unit 12 shown in FIG. 8 includes the connectors 31 and 32, a CPU 36, a RAM 37, a ROM 38, an interface 39, an audio switch 40 and a charge controller 41. The functions of the identifying means 9 and the control signal transmitting means 10 shown in FIG. 6 are realized by control processor functions of the CPU 36. The ROM 38 stores programs of the CPU 36 and the like. The connector 31 includes high-frequency signal terminals t1, power terminals t2, low-frequency signal terminals t3 for the audio signal or the like, and control signal terminals t4.

If the connector 31 of the buffer unit 12 is connected to the external connection terminal part 23 of the communication unit body 11 and the connector 32 of the buffer unit 12 is connected to the connector 33 of the portable telephone 13, the power terminals of the portable telephone 13 become connected to the power terminals t2. As a result, the power from the battery 14 is supplied to the portable telephone 13 via the charge controller 41, and a secondary battery of the power unit of the portable telephone 13 is charged. In addition, the operating power from the battery 14 is supplied to various parts of the buffer 12 including the CPU 36. On the other hand, a high-frequency circuit (not shown) of the portable telephone 13 is connected to the radio processor 18 or the amplifier 17 of the communication unit body 11 via the high-frequency signal terminals t1 and the like. A low-frequency circuit (not shown) and an audio signal circuit (not shown) of the portable telephone 13 are connected to the baseband processor 19 or the communication controller 20 of the communication unit body 11 via the low-frequency signal terminals t3 and the audio switch 40. Furthermore, the subscriber's number storage 34 and a transmitter part (not shown) for other control signals of the portable telephone 13 are connected to the communication controller 20 of the communication unit body 11 via the control signal terminals t4 and the like.

The user (owner) of the portable telephone 13 mounts the portable telephone 13 on the communication unit body 11 of the automobile telephone when riding the automobile which is provided with the automobile telephone. The mounting of the portable telephone 13 is detected by a known detecting means (not shown), and the CPU 36 of the buffer unit 12 is started in response to the detection made by the detecting means. The started CPU 36 reads the subscriber's number from the subscriber's number storage 34 of the portable telephone 13 via the interface 39 based on the program which is stored in the ROM 38, and transfers the subscriber's number to the communication controller 20 of the communication unit body 11 via the interface 39. In this case, the CPU 36 of the buffer unit 12 can recognize the communications company and the radio frequency band from the subscriber's number and transfer the same to the communication unit body 11. Alternatively, the communications company and the radio frequency band of the portable telephone 13 can be recognized in the communication controller 20 or the logic controller 21 of the communication unit body 11.

Accordingly, the communication unit body 11 can communicate using the subscriber's number of the portable telephone 13 instead of using the subscriber's number stored in the subscriber's number storage 22 of the communication unit body 11. For example, the call can be made between the communication unit body 11 and the general subscriber telephone (not shown) by the communication function of the communication unit body 11 using the hands-free microphone 26 and the hands-free speaker 27. In this case, the selection as to whether or not to use he subscriber's number stored in the subscriber's number storage 22 of the communication unit body 11 can be made from a push-button dial (not shown) of the communication unit body 11 or the push-button dial (not shown) of the portable telephone 13.

Because it is possible to automatically set the subscriber's number of the portable telephone 13 to the communication unit body 11, the user of the portable telephone 13 can receive the registered special services or the like even when riding in the automobile by use of the automobile telephone which is made up of the communication unit body 11. In other words, the portable telephone 13 can be applied to the automobile telephone similarly to the manner in which an identification (ID) card is used.

In addition, by recognizing the radio frequency band of the portable telephone 13 in the buffer unit 12 or the communication unit body 11, it is possible to communicate by controlling the oscillation frequency of a frequency synthesizer (not shown) of the radio processor 18 within the communication unit body 11 so as to switch to the radio frequency band of the portable telephone 13. Furthermore, it is possible to communicate using the radio frequency band of the communication unit body 11 based solely on the subscriber's number of the portable telephone 13.

The automobile may move from the service area of the communications company to which the portable telephone 13 is subscribed to the service area of the communications company to which the automobile telephone is subscribed. In this case, when the communication controller 20 or the logic controller 21 of the communication unit body 11 recognizes the change of the service area during the call made by the communication function of the communication unit body 11 using the subscriber's number of the portable telephone 13, it is possible to continue the call by switching the subscriber's number from the subscriber's number of the portable telephone 13 to the subscriber's number of the communication unit body 11.

Next, a description will be given of the operation of the CPU 36 of the buffer unit 12 when recognizing the communications company and the radio frequency band of the portable telephone 13 by the CPU 36, with reference to FIG. 9.

Figure 9:
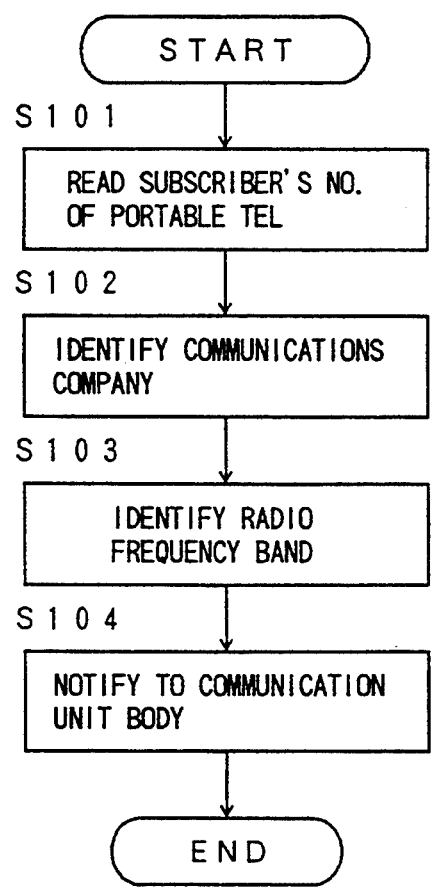
FIG. 9 is a flow chart for explaining the operation of a CPU of the buffer unit shown in FIG. 8.

The process shown in FIG. 9 starts when the portable telephone 13 is connected to the communication unit body 11 via the buffer unit 12. A step S101 reads the subscriber's number of the portable telephone 13 from the subscriber's number storage 34 of the portable telephone 13. A step S102 recognizes the communications company to which the portable telephone 13 is subscribed based on the read subscriber's number. Then, a step S103 recognizes the radio frequency band of the portable telephone 13 based on the read subscriber's number. These steps S101 through S103 correspond to the functions of the identifying means 9 shown in FIG. 6.

In addition, a step S104 notifies the recognizes communications company and radio frequency band to the communication unit body 11, and the process ends. This step S104 corresponds to the function of the control signal output means 10 shown in FIG. 6.

Figure 10:
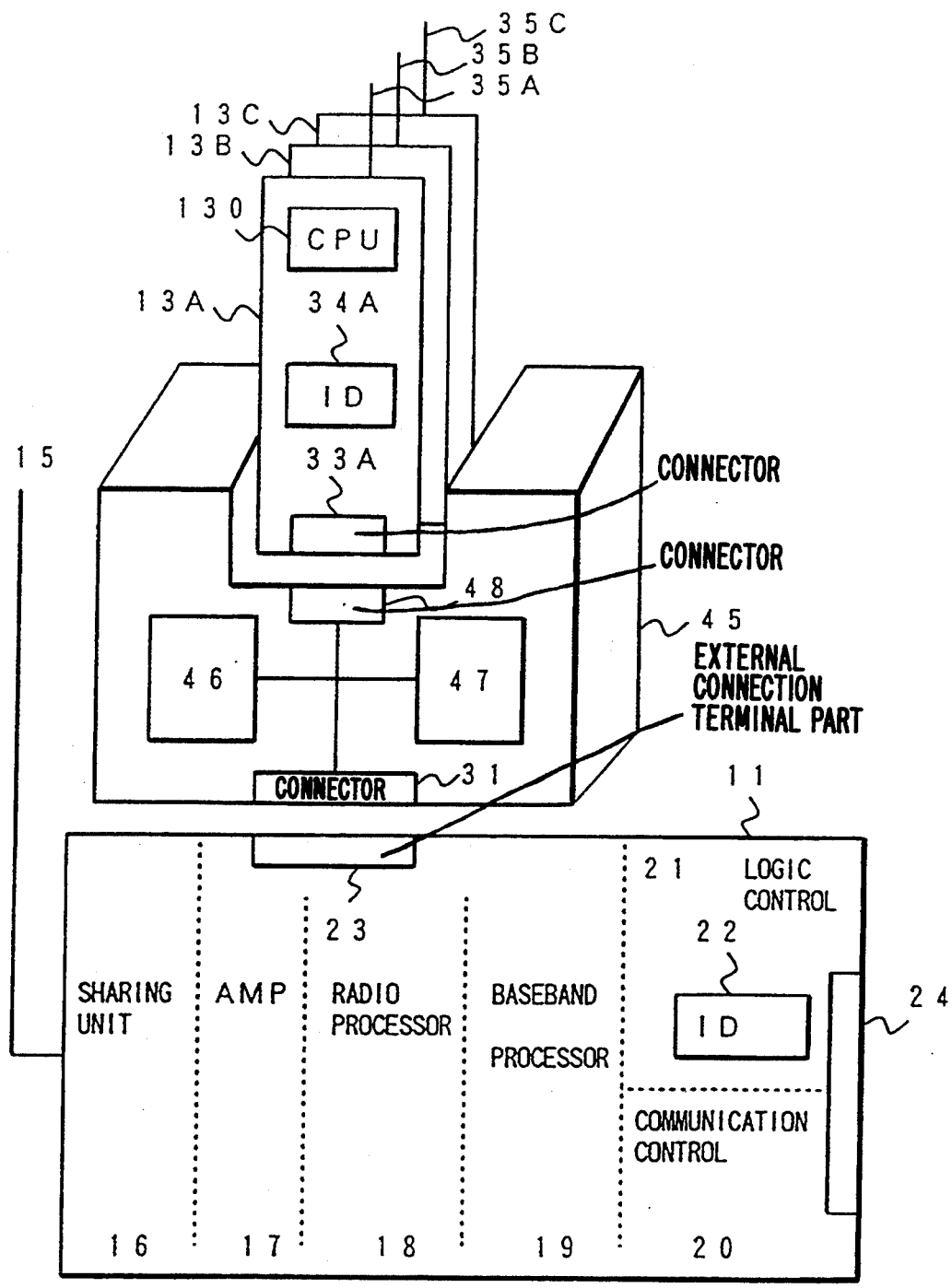
FIG. 10 is a system block diagram showing a second embodiment of the mobile telephone unit according to the present invention.

Next, a description will be given of a second embodiment of the mobile telephone unit according to the present invention, by referring to FIG. 10. In FIG. 10, those parts which are the same as those corresponding parts in FIG. 7 are designated by the same reference numerals, and a description thereof will be omitted. Furthermore, the illustration of the battery, handset, facsimile machine, personal computer and the like in FIG. 10 is omitted.

In this embodiment, a buffer unit 45 enables simultaneous connection of a plurality of portable telephones 13A, 13B and 13C to the communication unit body 11. The portable telephones 13A, 13B and 13C may have the same shape or have mutually different shapes. The portable telephone 13A includes a CPU 130, a connector 33A and a subscriber's number storage 34A. The other portable telephones 13B and 13C respectively have a connector and a subscriber's number storage, similarly to the portable telephone 13A. In addition, the portable telephones 13A, 13B and 13C respectively have antennas 35A, 35B and 35C.

On the other hand, the buffer unit 45 includes connectors 31 and 48, an identifying means 46 and a control signal transmitting means 47.

The functions of the identifying means 46 and the control signal transmitting means 47 of the buffer unit 45 can be realized by the control functions of the CPU and the like of the buffer unit 45 corresponding to the CPU 36 and the like shown in FIG. 8.

The connector 31 of the buffer unit 45 is connected to the external connection terminal part 23 of the communication unit body 11, and the users of the portable telephones 13A, 13B and 13C connect the connectors (only 33A shown) of the portable telephones 13A, 13B and 13C to the connector 48 of the buffer unit 45 when riding in the same automobile which is provided with the automobile telephone, that is, the communication unit body 11. The buffer unit 45 detects the mounting of the portable telephones 13A, 13B and 13C, and transfers to the communication unit body 11 the subscriber's numbers which are read from the subscriber's number storages (only 34A shown) of the portable telephones 13A, 13B and 13C using the function of the control signal transmitting means 47.

Accordingly, one of the users of the portable telephones 13A through 13C wishing to make a call can call via the communication unit body 11 using the subscriber's number of his portable telephone by carrying out a calling operation from the portable telephone or the hands-free dial of the communication unit body 11. In addition, a call to each one of the portable telephones 13A through 13C can be identified in the communication unit body 11 or the buffer unit 45, so as to alarm the user of the called portable telephone by a ringing bell or the like. In this case, it is possible to easily identify the called portable telephone by displaying the called subscriber's number, for example.

Although the call can be made using only one of the portable telephones 11A through 11C at one time, it is still very convenient when the portable telephones 11A through 11C can be mounted simultaneously to the buffer unit 45. This is because it is unnecessary to disconnect one portable telephone and connect another portable telephone as in the conventional case. In other words, a call can be made from one portable telephone immediately after a call using another portable telephone is finished. Moreover, it is possible to make a facsimile communication from the facsimile machine or a data communication from the personal computer using the subscriber's number of any one of the portable telephones 13A through 13C.

The one aspect of the present invention is of course not limited to the above described embodiments, and the present invention can employ a space diversity system phasing preventing means which is employed in mobile radio communication systems, for example. In addition, it is possible to provide a switching means within the communication unit body 11 to switch between the buffer unit 12 (or 45), and the high-frequency stage, the low-frequency-stage and the control stage. This switching means may be switched manually or, in response to detection the mounting of the portable telephone 13 or (portable telephones 13A through 13C) to the buffer unit 12 (or 45).

Figure 11:
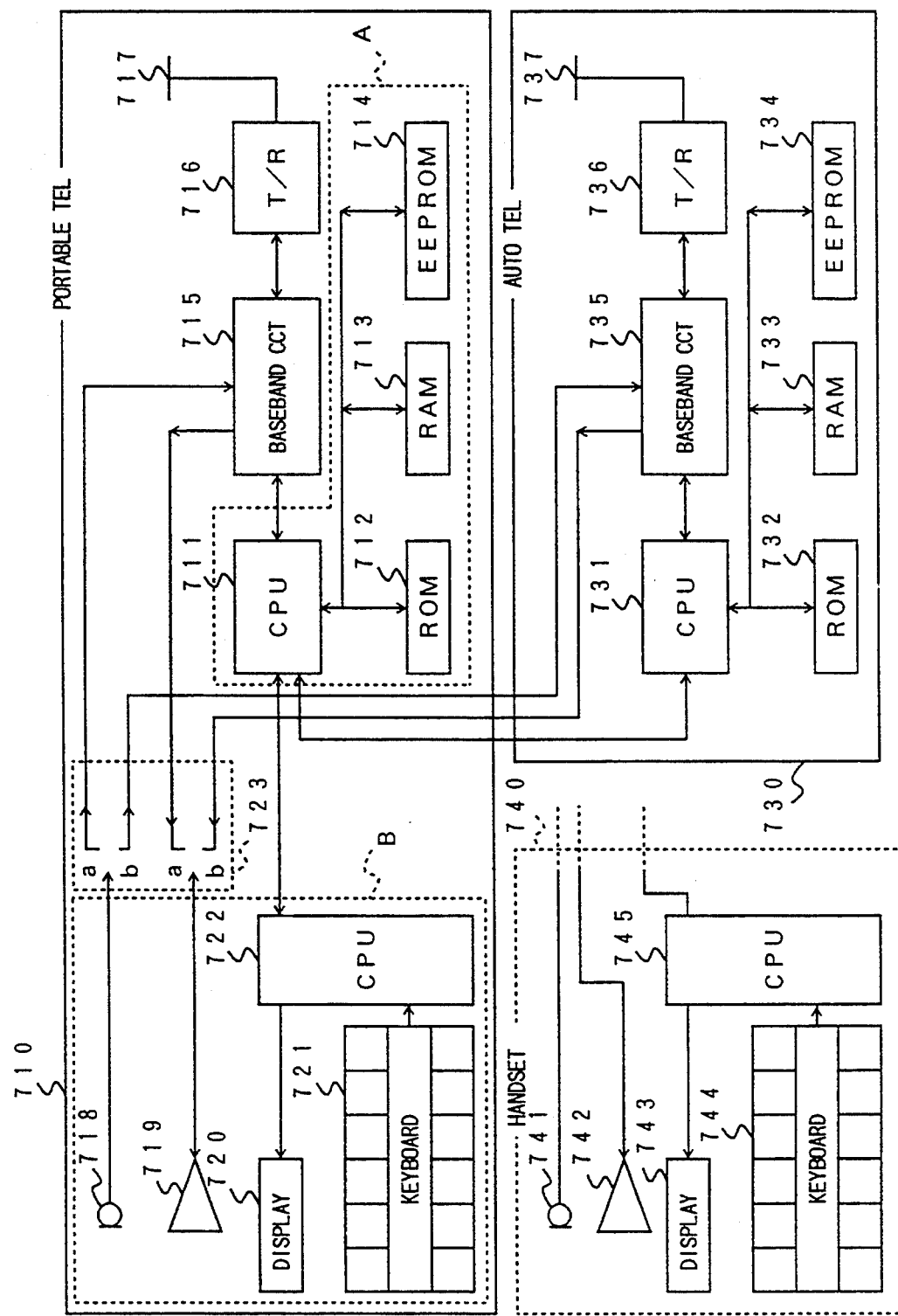
FIG. 11 is a system block diagram showing a third embodiment of the mobile telephone unit according to the present invention.
Figure 12:
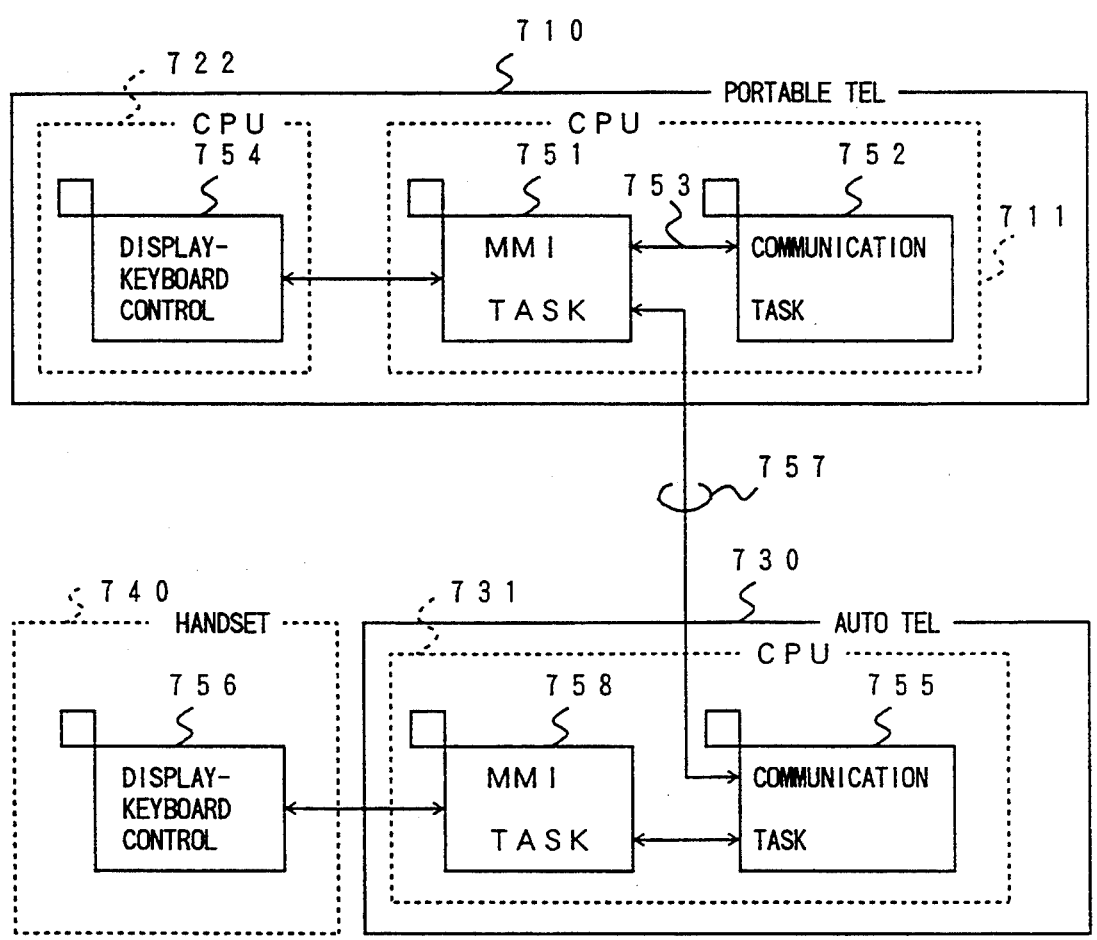
FIG. 12 is a diagram for explaining a control operation of the third embodiment.

Next, a description will be given of a third embodiment of the mobile telephone unit according to the present invention, by referring to FIGS. 11 and 12. FIG. 11 shows an essential part of the third embodiment, and FIG. 12 is a diagram for explaining the control operation of the third embodiment.

In FIG. 11, a portable telephone 710 is made up of a communication control part A, a baseband circuit 715, a transmitter/receiver 716, an antenna 717, a man-machine interface B, and a switch 723.

The communication control part A includes a CPU 711, a ROM 712, a RAM 713 and an EEPROM 714. The ROM 712 stores programs for realizing the software processes of the CPU 711. The RAM 713 is used to write and read data which are required for the software processes of the CPU 711. The EEPROM 714 is a non-volatile memory which stores dial information such as names and telephone numbers, and ID information such as the manufacturer's product number.

As is well known, the baseband circuit 715 limits the band of the data and audio signal in the baseband, carries out a multiplexing in a predetermined format, and carries out a demultiplexing complementary to the multiplexing. In addition, the transmitter/receiver 716 has a known construction including a modulator, a demodulator, a transmitting amplifier, a transmitter/receiver duplexer and the like.

The man-machine interface B has the same functions as a handset. The man-machine interface B includes a microphone 718, a speaker 719, a display 720, a keyboard 721 and a CPU 722. The microphone 718 picks up the voice which is to be transmitted and converts the voice into an audio signal. The speaker 719 sounds the received audio signal. The display 720 displays information necessary for the operation such as the telephone number and the name. The keyboard 721 is used to input data necessary for the communication. The CPU 722 displays the data input from the keyboard 721 on the display 720, and exchanges information between the CPU 711.

The man-machine interface B of the portable telephone 710 is connected to the baseband circuit 715 or to a baseband circuit 735 within an automobile telephone 730 via the switch 723. When using the automobile telephone 730 by itself, a handset 740 is connectable to the automobile telephone 730. The automobile telephone 730 includes a communication control part, the baseband circuit 735, a transmitter/receiver 736 and an antenna 737. The communication control part of the automobile telephone 730 includes a CPU 731, a ROM 732, a RAM 733 and an EEPROM 734.

The CPU 731, the ROM 732, the RAM 733 and the EEPROM 734 which form the communication control part of the automobile telephone 730 carry out operations similar to those of the communication control part A of the portable telephone 710. In addition, the baseband circuit 35, the transmitter/receiver 736 and the antenna 737 carry out operations similar to those of the baseband circuit 715, the transmitter/receiver 716 and the antenna 717 of the portable telephone 710. However, the transmission output of the automobile telephone 730 is greater than that of the portable telephone 710.

The handset 740 has the same construction as the man-machine interface B of the portable telephone 710. In other words, the handset 740 includes a microphone 741, a speaker 742, a display 743, a keyboard 744 and a CPU 745. When using the automobile telephone 740 by itself, information is exchanged between the CPUs 745 and 731.

As shown in FIG. 12, the control functions of the CPU 711 of the portable telephone 710 includes a man-machine interface task (man-machine interface function) 751 and a communication task (communication control function) 752. The exchange of information between the tasks 751 and 752 is prescribed as an interface 753. In addition, the CPU 722 of the portable telephone 710 includes a display-keyboard control task 754.

On the other hand, the control functions of the CPU 731 of the automobile telephone 730 includes a communication task 755 and a man-machine interface task 758. When using the automobile telephone 730 by itself, the man-machine interface 758 exchanges information between the communication task 755 and a display-keyboard control task 756 which is a control function of the CPU 745 of the handset 740. When using the automobile telephone 730 in a state where the portable telephone 710 is connected thereto, only the man-machine interface 751 operates. By connecting the switch 723 of the portable telephone 710 to the terminal b in FIG. 11, the microphone 718 and speaker 719 become connected to the baseband circuit 735 of the automobile telephone 730 via this switch 723.

Figure 1:
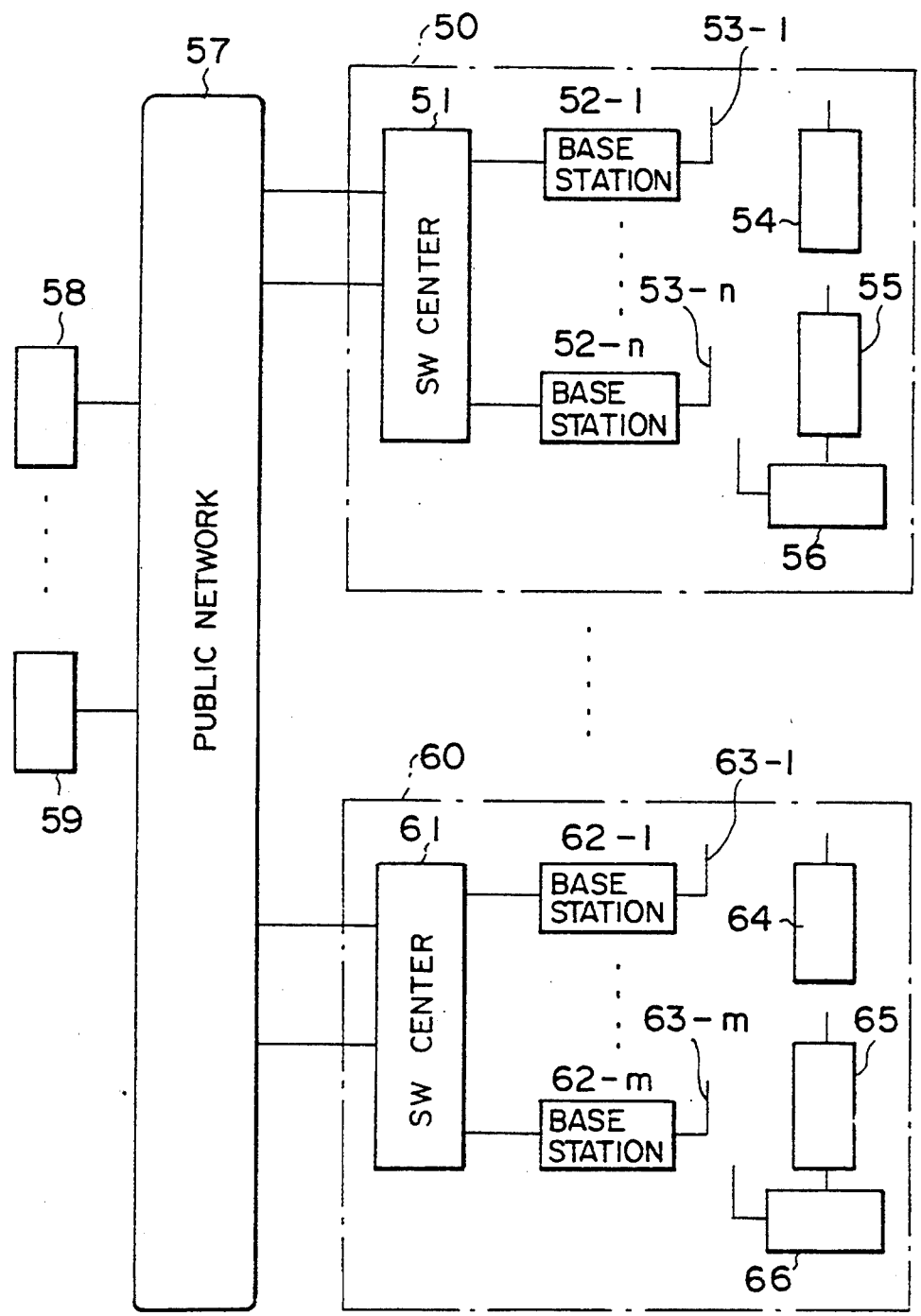
FIG. 1 is a system block diagram for explaining an example of a conventional automobile telephone system and a portable mobile telephone system.
Figure 2:
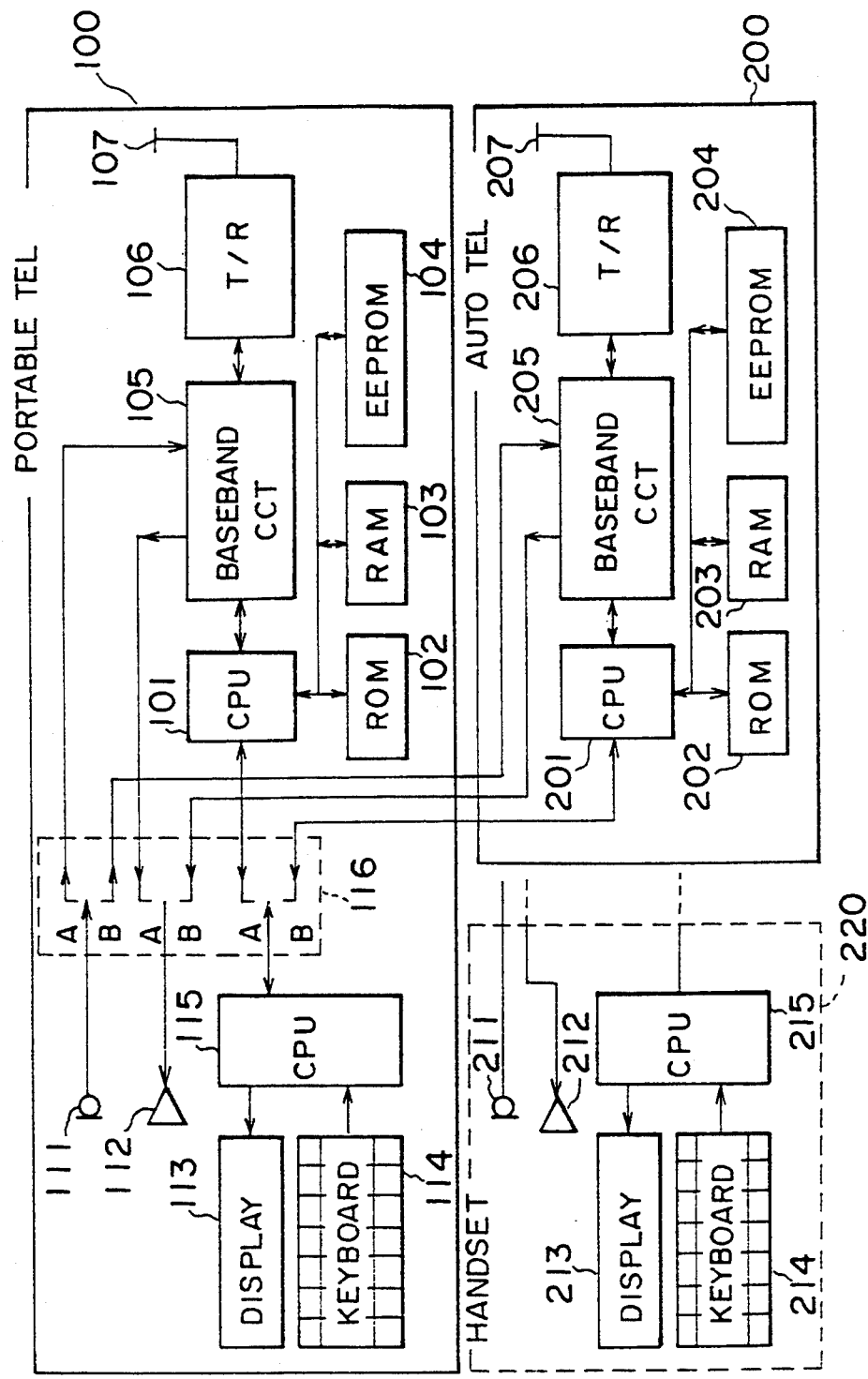
FIG. 2 is a system block diagram showing an example of a conventional mobile telephone unit.
Figure 3:
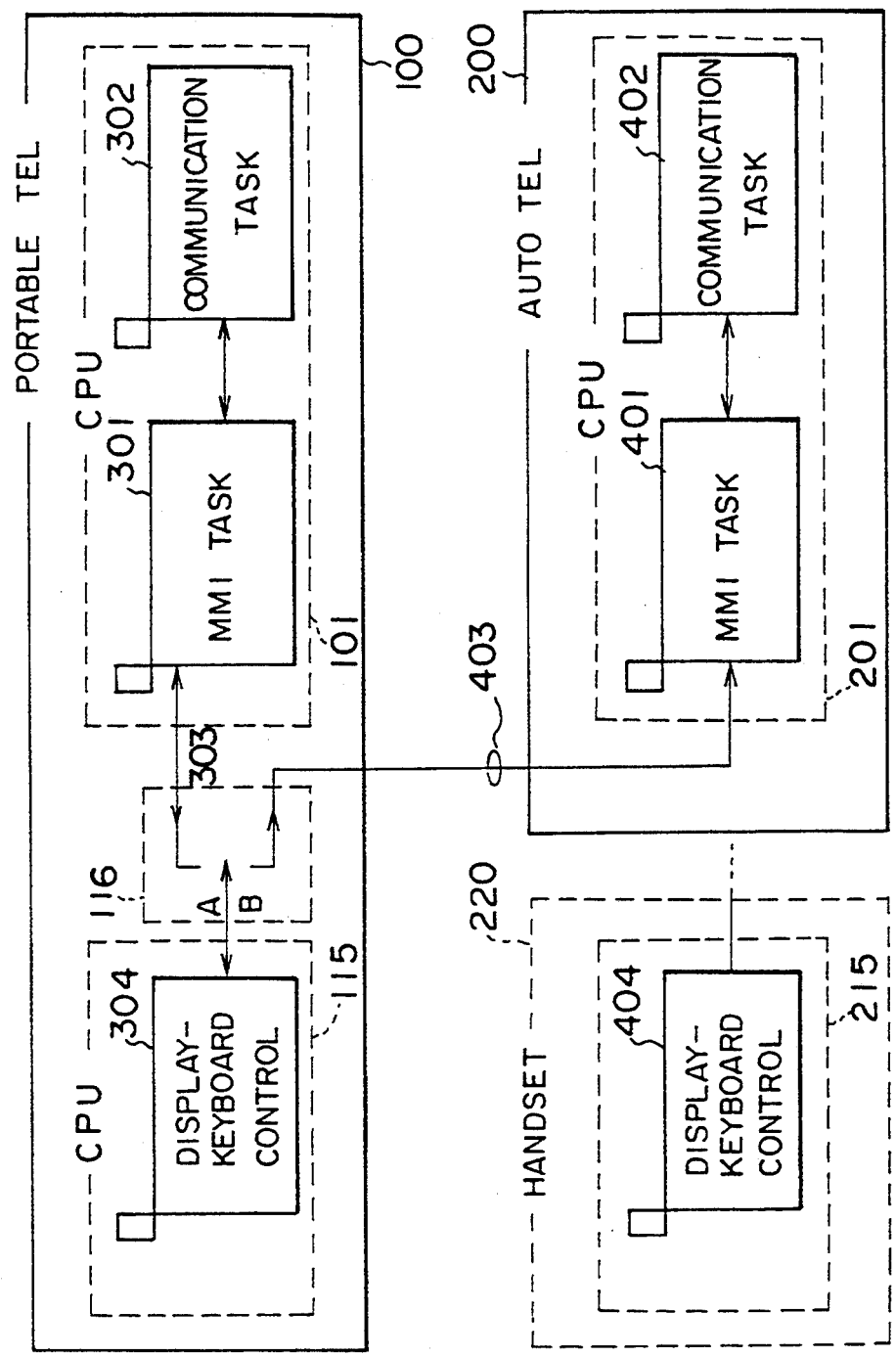
FIG. 3 is a diagram for explaining a control operation of the conventional mobile telephone unit shown in FIG. 2.
Figure 4:
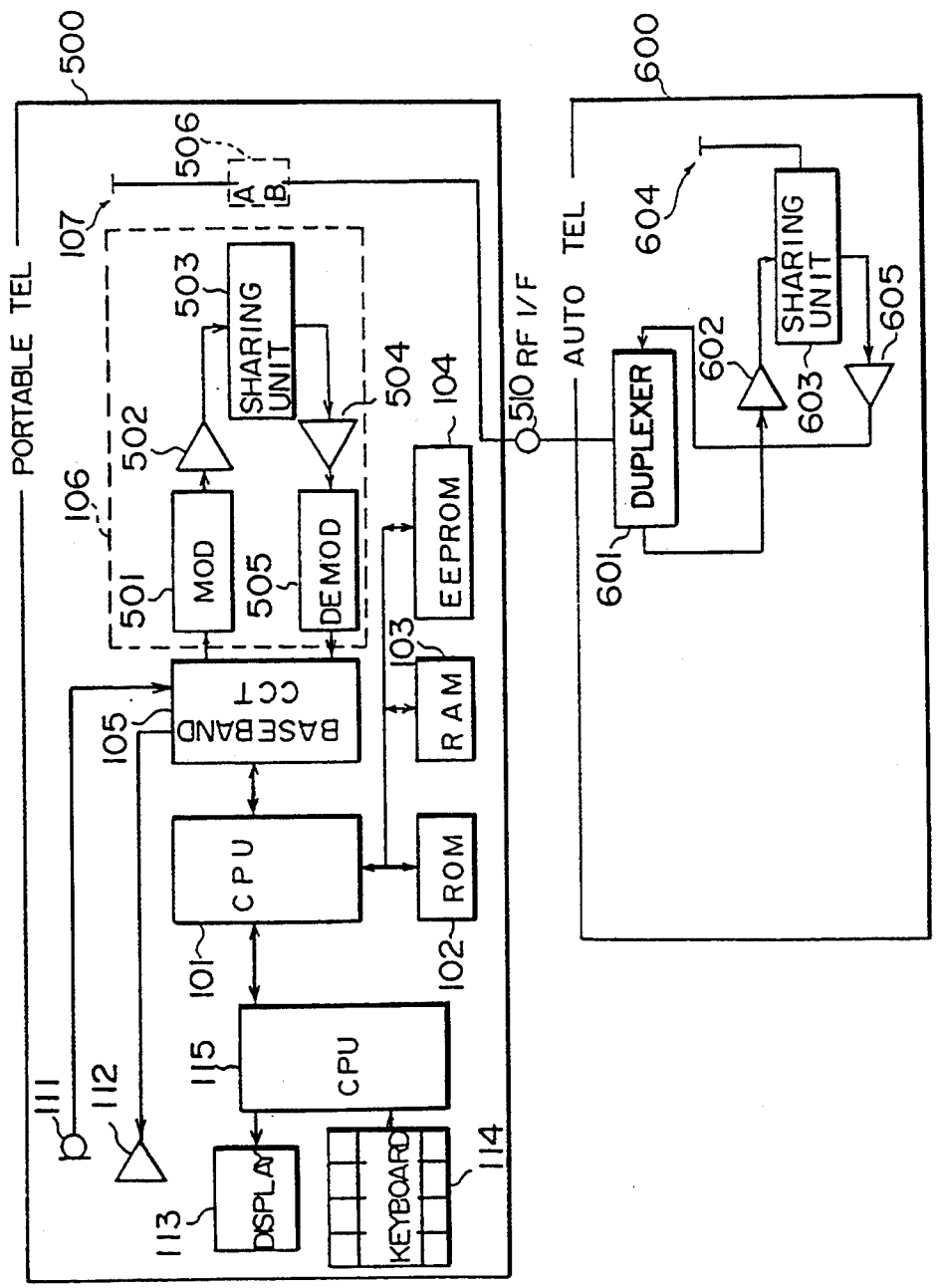
FIG. 4 is a system block diagram showing another example of a conventional mobile telephone unit.
Figure 5:
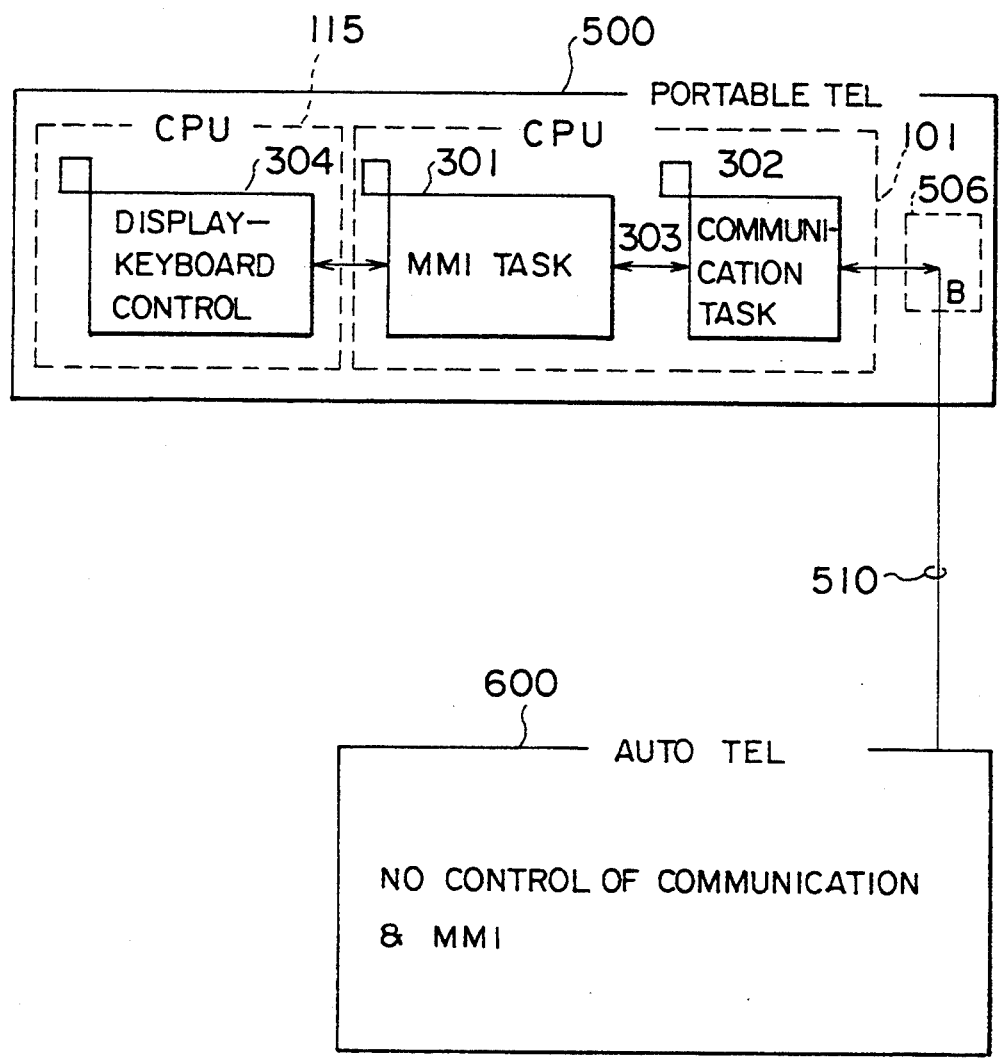
FIG. 5 is a diagram for explaining a control operation of the conventional mobile telephone unit shown in FIG. 4.

When the portable telephone 710 and the automobile telephone 730 are connected in the above described manner, the necessary exchange of information between the man-machine interface task 751 of the CPU 711 within the portable telephone 710 and the communication task 755 of the CPU 731 within the automobile telephone 730 is made via an interface 757. This interface 757 is set the same as the interface 753 between the communication task 752 and the man-machine interface task 751 within the portable telephone 710. Hence, according to this embodiment, the man-machine interface task 751 of the portable telephone 710 is used when the automobile telephone 730 is used in the state where the portable telephone 710 is connected thereto, unlike the conventional mobile telephone units shown in FIGS. 2 and 4.

Next, a description will be given of the operating sequence of the interface 753 of the portable telephone 710 when making a call out, by referring to FIG. 13.

In a wait state prior to making the actual call out operation, the communication task 752 receives control channel data from the base station in a step S1. Then, the communication task 752 notifies the man-machine interface task 751 that a service can be made in a step S2. In this state, if the man-machine interface task 751 receives off-hook information from the user in a step S3, the man-machine interface task 751 notifies the off-hook information to the communication task 752 in a step S4. In addition, if the dial information from the user is received in a step S5, the man-machine interface 751 notifies the dial information to the communication task 752 in a step S6.

When the communication task 752 receives the off-hook information and the dial information, the communication task 752 transmits a call out request to the base station in a step S7. The base station transmits line connection information in response to the call out request in a step S8, and the communication task 752 which receives this line connection information notifies the line connection to the man-machine interface 751 in a step S9. As a result, a talking path is set and a call becomes possible.

Thereafter when the call ends, the man-machine interface task 751 receives on-hook information from the user in a step S10, the man-machine interface task 751 notifies the on-hook information to the communication task 752 in a step S11. The communication task 752 transmits a disconnect request to the base station in response to the on-hook information in a step S12, and waits for a disconnect acknowledge response from the base station. When the communication task 752 receives the disconnect acknowledge response from the base station in a step S13, the communication task 752 transmits a disconnect acknowledge notification to the man-machine interface task 751 in a step S14.

Next, a description a description will be given of the operating sequence of the interface 753 of the portable telephone 710 when making a call in, by referring to FIG. 14.

In a wait state, the communication task 752 receives control channel data from the base station in a step S21. Then, the communication task 752 notifies the man-machine interface task 751 that a service can be made in a step S22. In this state, if the communication task 752 receives a call in request from the base station in a step S23, the communication task 752 makes a call in notification to the man-machine interface task 751 in a step S24.

The man-machine interface task 751 transmits a ringing tone to the user in a step S25 in response to the call in notification. If the user off-hooks in response to this ringing tone, the off-hook information from the user is notified to the man-machine interface task 751 in a step S26 and to the communication task 752 in a step S27. The communication task 752 transmits a call in response to the base station in a step S28 in response to this off-hook information. As a result, a talking path is set and a call becomes possible.

When the call ends and the communication task 752 receives a disconnect request from the base station in a step S29, the communication task 752 notifies the disconnect request to the man-machine interface task 751 in a step S30. The man-machine interface task 751 transmits a busy tone to the user in a step S31 in response to the disconnect request. Hence, if the user off-hooks, the man-machine interface task 751 receives the off-hook information in a step S32, and the man-machine interface task 751 notifies this off-hook information to the communication task 752 in a step S33.

Figure 13:
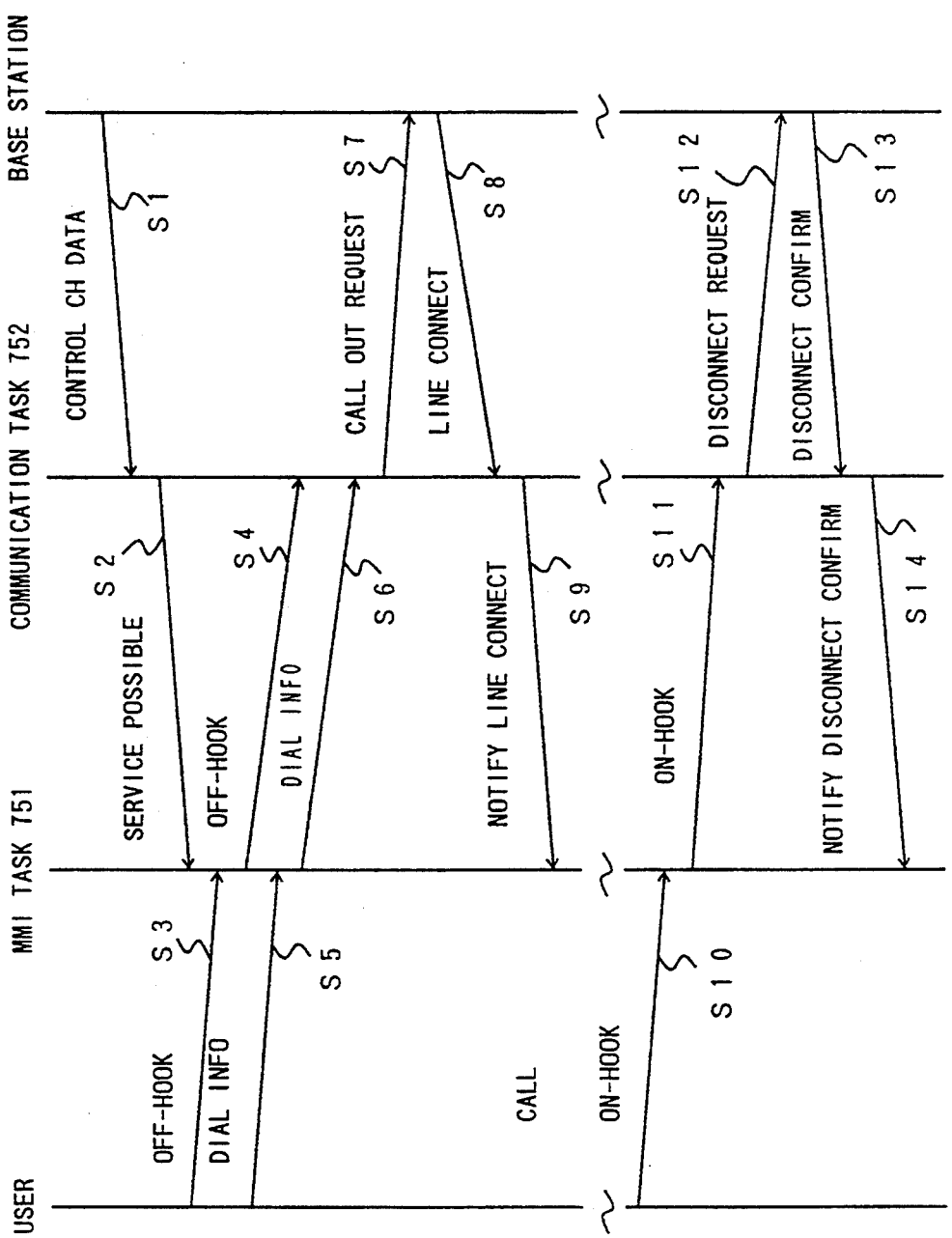
FIG. 13 is a time chart for explaining a call out operation of the third embodiment.
Figure 14:
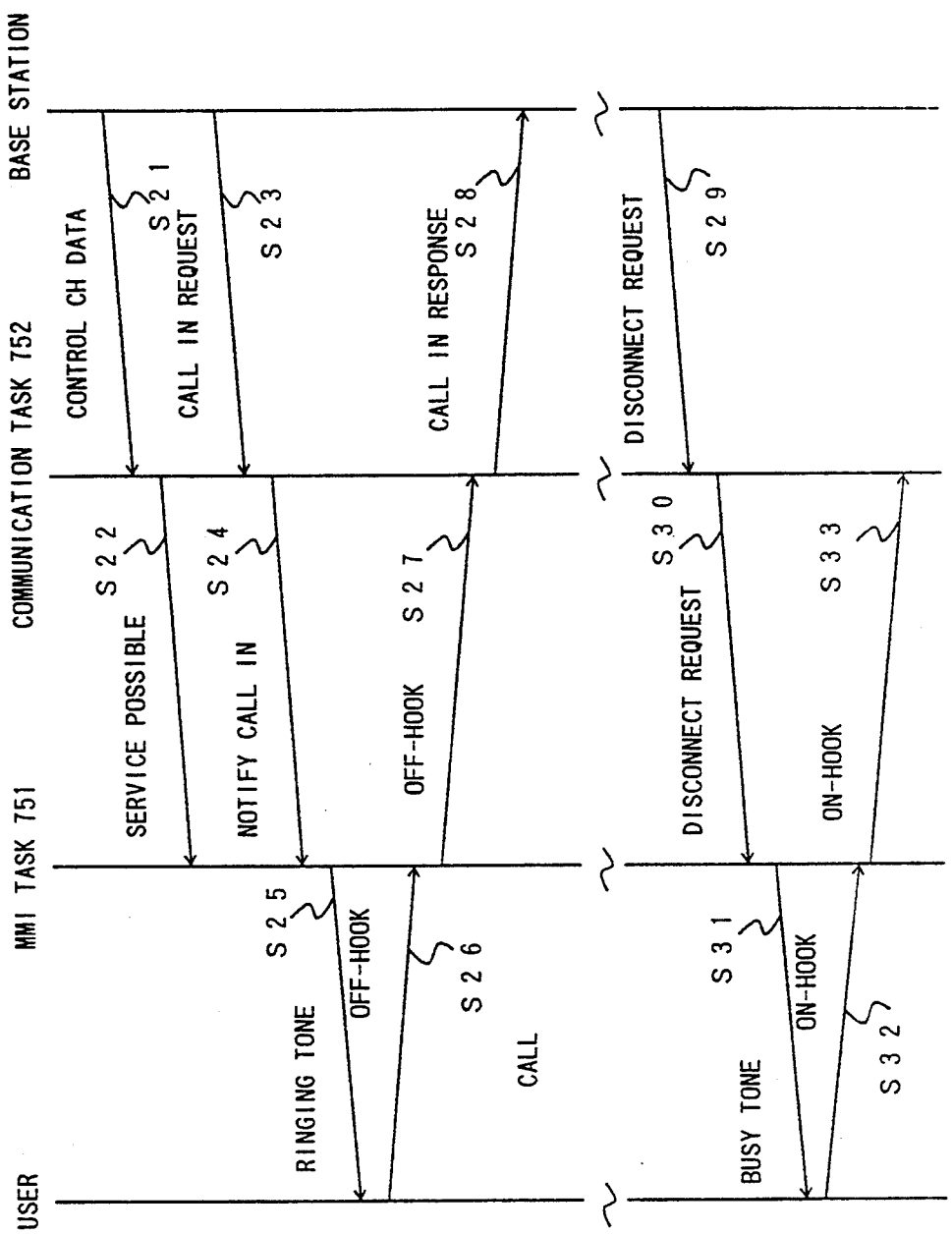
FIG. 14 is a time chart for explaining a call in operation of the third embodiment.

If the portable telephone 710 and the automobile telephone 730 are connected, the operations identical to those shown in FIGS. 13 and 14 are carried out between the man-machine interface task 751 and the communication task 755 via the interface 757. In this case, even if the man-machine interfaces differ between the portable telephone 710 and the automobile telephone 730, it is possible to always realize the same functions and operating methods as the portable telephone 710. For this reason, it is possible to connect a plurality of portable telephones 710 having different man-machine interfaces to one kind of automobile telephone 730, that is, to the same automobile telephone 730.

In addition, since this embodiment carries out the control with respect to the key input by the man-machine interface task 751 within the portable telephone 710, it is unnecessary to transfer the dial information such as the name and telephone number to the automobile telephone 730, and the response of the mobile telephone unit becomes quicker than that of the conventional mobile telephone units.

The interface 753 within the portable telephone 710 and the interface 757 between the portable telephone 710 and the automobile telephone 730 simply need to exchange the same information. Hence, the interface 753 may exchange the information using a RAM and the interface 757 may exchange the information using a serial signal, for example. Therefore, a communication is possible using the portable telephone 710 by itself or using the portable telephone 710 in a state connected to the automobile telephone 730. In either case, it is possible to use in common the dial information which is stored in the EEPROM 714.

Figure 15:
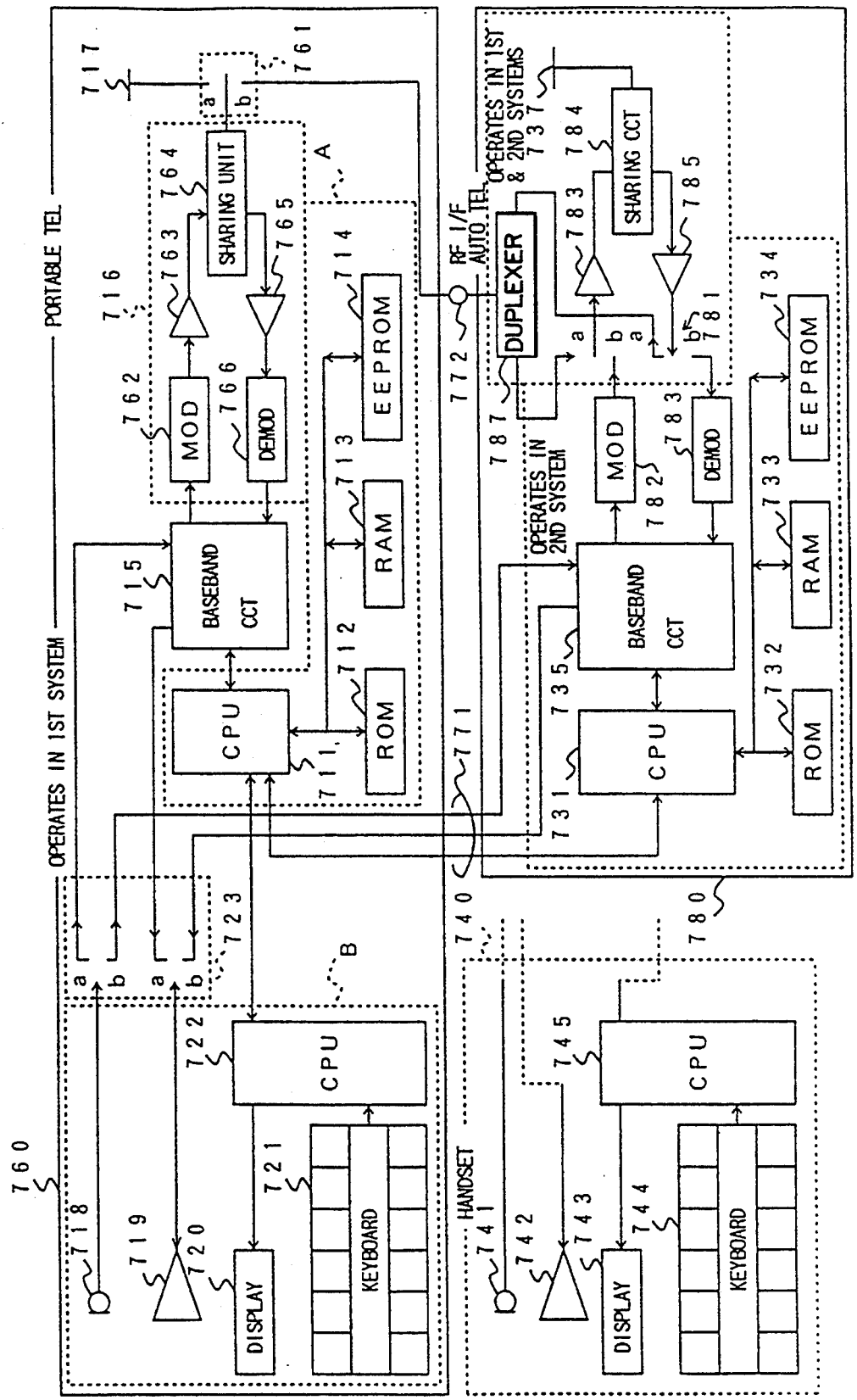
FIG. 15 is a system block diagram showing a fourth embodiment of the mobile telephone unit according to the present invention.

Next, a description will be given of a fourth embodiment of the mobile telephone unit according to the present invention, by referring to FIG. 15. In FIG. 15, those parts which are the same as those corresponding parts in FIG. 11 are designated by the same reference numerals, and a description thereof will be omitted.

If the portable telephone 710 and the automobile telephone 730 are connected in the third embodiment shown in FIG. 11, the communication control between the mobile telephone unit and the base station is carried out solely by the communication control part within the automobile telephone 730. For this reason, the mobile telephone unit can only communicate with a system to which the automobile telephone 730 can communicate. But in this fourth embodiment, measures are taken so that the mobile telephone unit can communicate with both systems to which the portable telephone and the automobile telephone can communicate, even if the two systems differ.

In FIG. 15, a portable telephone 760 includes a switch 761 in addition to those elements of the portable telephone 710 shown in FIG. 11. This portable telephone 760 can communicate with a first system. The transmitter/receiver 716 has a known modem circuit construction including a modulator 762, a transmitting amplifier 763, a transmitter/receiver duplexer 764, a receiving amplifier 765 and a demodulator 766.

A common terminal of the switch 761 is connected to a transmitter/receiver common terminal of the transmitter/receiver duplexer 764. The switch 761 has a terminal a connected to the antenna 717 and a terminal b connected to a transmitter/receiver common terminal of a transmitter/receiver duplexer 787 within an automobile telephone 780 which will be described later. When using the portable telephone 760 in a state connected to the automobile telephone 780, the switch 761 is connected to the terminal b.

The automobile telephone 780 includes a switch 781 and the transmitter/receiver duplexer 787 in addition to those elements of the automobile telephone 730 shown in FIG. 11. In FIG. 15, the construction of the transmitter/receiver 736 is shown so as to facilitate the understanding of the description, but the construction of the transmitter/receiver 736 may be the same as that of the transmitter/receiver 736 shown in FIG. 11. More particularly, the transmitter/receiver 736 is shown as including a modulator 782, a transmitting amplifier 783, a transmitter/receiver duplexer 784, a receiving amplifier 785 and a demodulator 786. The switch 781 includes two linked switching parts. The switch 781 connects a transmitting output end of the transmitter/receiver duplexer 787 to an input end of the transmitting amplifier 783 and connects a receiving input end of the transmitter/receiver duplexer 787 to an output end of the receiving amplifier 785 when connected to the terminal a.

On the other hand, when connected to the terminal b, the switch 781 connects an output end of the modulator 782 to the input end of the transmitting amplifier 783 and connects the output end of the receiving amplifier 785 to an input end of the demodulator 786.

The automobile telephone 780 can communicate with a second system which is different from the first system. Hence, the modem characteristics of the modulator 782 and the demodulator 786 are set so as to conform to the second system.

On the other hand, the characteristics of the transmitter/receiver duplexers 784 and 787, the transmitting amplifier 783 and the receiving amplifier 785 are set so as to cover the frequency bands of both the first and second systems. In addition, the baseband circuit 735 within the automobile telephone 780 is connected to the microphone 718 and the speaker 719 within the portable telephone 760 via a signal line interface 771 and the switch 723. The exchange of information is possible between the CPUs 711 and 731.

In this embodiment, a transmitter/receiver circuit (783–785, 787) of the automobile telephone 780 can be switched and connected to either a modem circuit (782, 786) and a control circuit (731–735) within the automobile telephone 780 or a modem circuit (762, 766) and a control circuit (711–715) within the portable telephone 760.

Next, a description will be given of the operation of this embodiment shown in FIG. 15. When communicating with the first system by connecting the portable telephone 760 and the automobile telephone 780, the switch 723 is connected to the terminal a, the switch 761 is connected to the terminal b and the switch 781 is connected to the terminal a. Hence, the man-machine interface B of the portable telephone 760 is connected to the communication control part A and the baseband circuit 715 via the switch 723 and exchanges 10 information therewith. In addition, a high-frequency signal (RF signal) is exchanged between the transmitter/- receiver 716 and the transmitter/receiver circuit within the automobile telephone 780 via an RF interface 772.

In the automobile telephone 780, the transmitting RF signal from the portable telephone 760 which is input to the transmitter/receiver duplexer 787 via the RF interface 772 is transmitted to the base station of the first system via the transmitter/receiver duplexer 787, the switch 781, the transmitting amplifier 783, the transmitter/receiver duplexer 784 and the automobile antenna 737. On the other hand, the RF signal from the base station of the first system is input to the portable telephone 760 via the automobile antenna 737, the transmitter/receiver duplexer 784, the receiving amplifier 785, the switch 781, the transmitter/receiver duplexer 787 and the RF interface 772.

The RF signal input to the portable telephone 760 is demodulated via the switch 761, the transmitter/receiver duplexer 764, the receiving amplifier 765 and the demodulator 766, and is thereafter input to the baseband circuit 715 wherein the demodulated signal is separated into the data and the audio signal. The data is supplied to the CPU 711, while the audio signal is supplied to the speaker 719 via the switch 723.

Accordingly, the mobile telephone unit can communicate with the first system by validating the RF interface 772, making all circuits within the portable telephone 760 active, and making the transmitter/receiver circuit (783–785, 787) within the automobile telephone 780 active.

Next, a description will be given of the case where the mobile telephone unit communicates with the second system by connecting the portable telephone 760 and the automobile telephone 780. In this case, the switch 723 is connected to the terminal b and the switch 781 is connected to the terminal b. As a result, the man-machine interface B within the portable telephone 760 is connected to the communication control part and the baseband circuit 735 within the automobile telephone 780 via the switch 723 and the signal line interface 771, and exchanges information therewith. In addition, in the automobile telephone 780, the modulator 782 and the demodulator 786 are respectively connected to the transmitting amplifier 783 and the receiving amplifier 785 via the switch 781.

Hence, when making a transmission, the audio and dial information and other data input from the man-machine interface B of the portable telephone 760 are input to the modulator 782 of the automobile telephone 780 via the baseband circuit 735 and is converted into an RF signal by carrying out a modulation prescribed by the second system. This RF signal is transmitted to the base station of the second system via the switch 781, the transmitting amplifier 783, the transmitter/receiver duplexer 784 and the automobile antenna 737.

On the other hand, the RF signal received from the base station of the second system is input to the demodulator 786 of the automobile telephone 780 via the automobile antenna 737, the transmitter/receiver duplexer 784, the receiving amplifier 785 and the switch 781, and is subjected to a demodulation prescribed by the second system. Output demodulated data and demodulated audio signal of the demodulator 786 are input to the CPU 731, the speaker 719 within the portable telephone 760 and the like via the baseband circuit 735.

Accordingly, the mobile telephone unit can communicate with the second system by validating the signal line interface 771, making only the man-machine interface B active in the portable telephone 760, and making all circuits within the automobile telephone 780 active.

According to this embodiment, it is possible to communicate with either one of the first and second systems, thereby making it possible to select the system in service in a region in which the automobile is located. In addition, the functions and operating methods which are the same as those of the portable telephone 760 can always be realized when making the call from the portable telephone 760 which is connected to the automobile telephone 780.

Of course, when making the communication with only a selected one of the first and second systems, a predetermined one of the signal line interface 771 and the RF interface 772 needs to be connected depending on the selected system.

Figure 16:
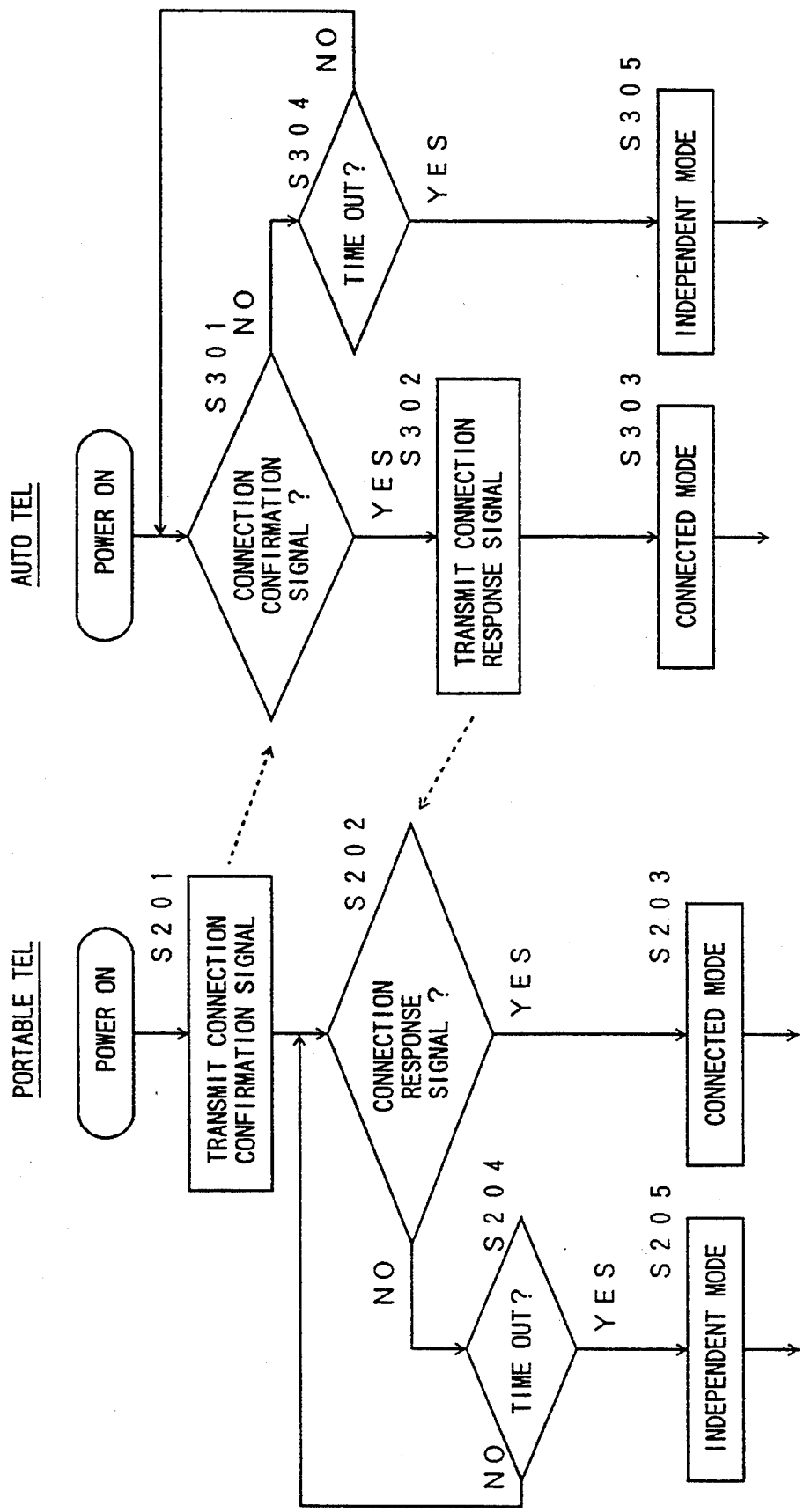
FIG. 16 is a flow chart for explaining an initializing process of the third and fourth embodiments.

Next, a description will be given of an initializing process of the third and fourth embodiments, by referring to FIG. 16. This initializing process determines the connected/disconnected state of the portable telephone 710 (or 760) with respect to the automobile telephone 730 (or 780). In FIG. 16, the process of the CPU 711 within the portable telephone 710 (or 760) is shown on the left hand side, and the process of the CPU 731 within the automobile telephone 730 (or 780) is shown on the right hand side.

In FIG. 16, the CPU 711 transmits a connection confirmation signal to the automobile telephone 730 (or 780) in a step S201 when the power of the portable telephone 710 (or 760) is turned ON. The CPU 711 then decides whether or not a connection response signal is received from the automobile telephone 730 (or 780) in a step S202. If the decision result in the step S202 is YES, the CPU 711 determines that the portable telephone 710 (or 760) is connected to the automobile telephone 730 (or 780) in a step S203. In other words, a connected mode of the portable telephone 710 (or 760) is detected. After the step S203, the communication task 752 of the portable telephone 710 (or 760) is made inactive, and the man-machine interface task 751 is made active.

On the other hand, if the decision result in the step S202 is NO, the CPU 711 decides in a step S204 whether or not a predetermined time has elapsed from the time when the decision of the step S202 was made. The process returns to the step S202 if the decision result in the step S204 is NO. But when the decision result in the step S204 is YES, the CPU 711 determines that the portable telephone 710 (760) is disconnected from the automobile telephone 730 (or 780) in a step S205. In other words, an independent mode of the portable telephone 710 (or 760) is detected. After the step S205, the communication task 752 of the portable telephone 710 (or 760) is made active, and the man-machine interface task 751 is made active.

On the other hand, when the power of the automobile telephone 730 (or 780) is turned ON, the CPU 731 decides whether or not the connection confirmation signal is received from the portable telephone 710 (or 760). The decision result in the step S301 is YES if the step S201 is carried out in the portable telephone 710 (or 760). If the decision result in the step S301 is YES, the CPU 731 transmits the connection response signal to the portable telephone 710 (or 760). Hence, the decision result in the step S202 becomes YES in the portable telephone 710 (or 760) when the step S302 is carried out in the automobile telephone 730 (or 780). After the step S302, the CPU 731 determines that the portable telephone 710 (or 760) is connected to the automobile telephone 730 (780) in a step S303. In other words, the connected mode is detected. After the step S303, the communication task 755 of the automobile telephone 730 (or 780) is made active, and the man-machine interface 758 is made inactive.

But if the decision result in the step S301 is NO, the CPU 731 decides whether or not a predetermined time has elapsed from the time when the decision of the step S301 was made. The process returns to the step S301 if the decision result in the step S304 is NO. On the other hand, if the decision result in the step S304 is YES, the CPU 731 determines that the portable telephone 710 (or 760) is disconnected from the automobile telephone 730 (or 780). In other words, the independent mode of the portable telephone 710 (or 760) is detected. After the step S305, the communication task 755 of the automobile telephone 730 (or 780) is made active, and the man-machine interface 758 is made active.

The above described method of detecting the connected or independent mode of the portable telephone during the initializing process can also be applied to the first and second embodiments described above.

Figure 17:
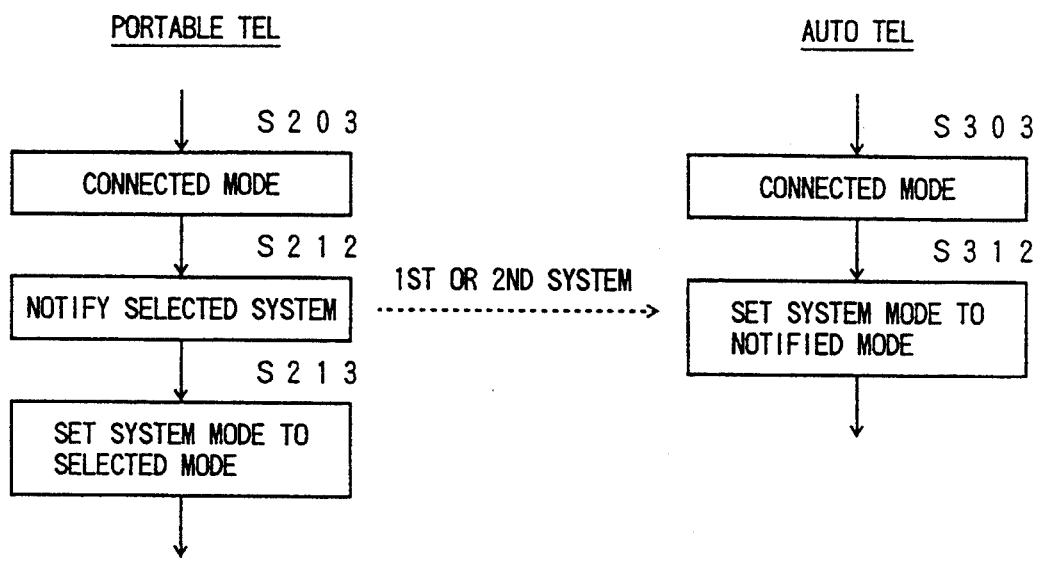
FIGS. 17 and 18 are flow charts for explaining the operation of the fourth embodiment.

Next, a description will be given of the system selection operation of the fourth embodiment after the initializing process shown in FIG. 16 is carried out. In FIG. 17, the process of the portable telephone 710 (or 760) is shown on the left hand side, and the process of the automobile telephone 730 (or 780) is shown on the right hand side. In FIG. 17, those steps which are the same as those corresponding steps in FIG. 16 are designated by the same reference numerals, and a description thereof will be omitted.

The process shown in FIG. 17 is carried out when the connected mode is detected in both the portable telephone 710 (or 760) and the automobile telephone 730 (or 780). In other words, after the step S203, the CPU 711 of the portable telephone 710 (or 760) notifies the selected system, that is, the first or second system, to the automobile telephone 730 (or 780) in a step S212. The selected system is stored in the EEPROM 714 of the portable telephone 710 (or 760). Then, the CPU 711 sets the system mode to the selected system by appropriately controlling the connections of the switches and the like within the portable telephone 710 (or 760). The portable telephone 710 (or 760) thereafter carries out the operation described above.

On the other hand, after the connected mode is detected in the step S303, the CPU 731 of the automobile telephone 730 (or 780) sets the system mode to the selected system mode which is notified from the portable telephone 710 (or 760) in a step S312 by appropriately controlling the connections of the switches and the like within the automobile telephone 730 (or 780). The selected system mode is notified from the portable telephone 710 (or 760) when it carries out the step S212. The automobile telephone 730 (or 780) thereafter carries out the operation described above.

Figure 18:
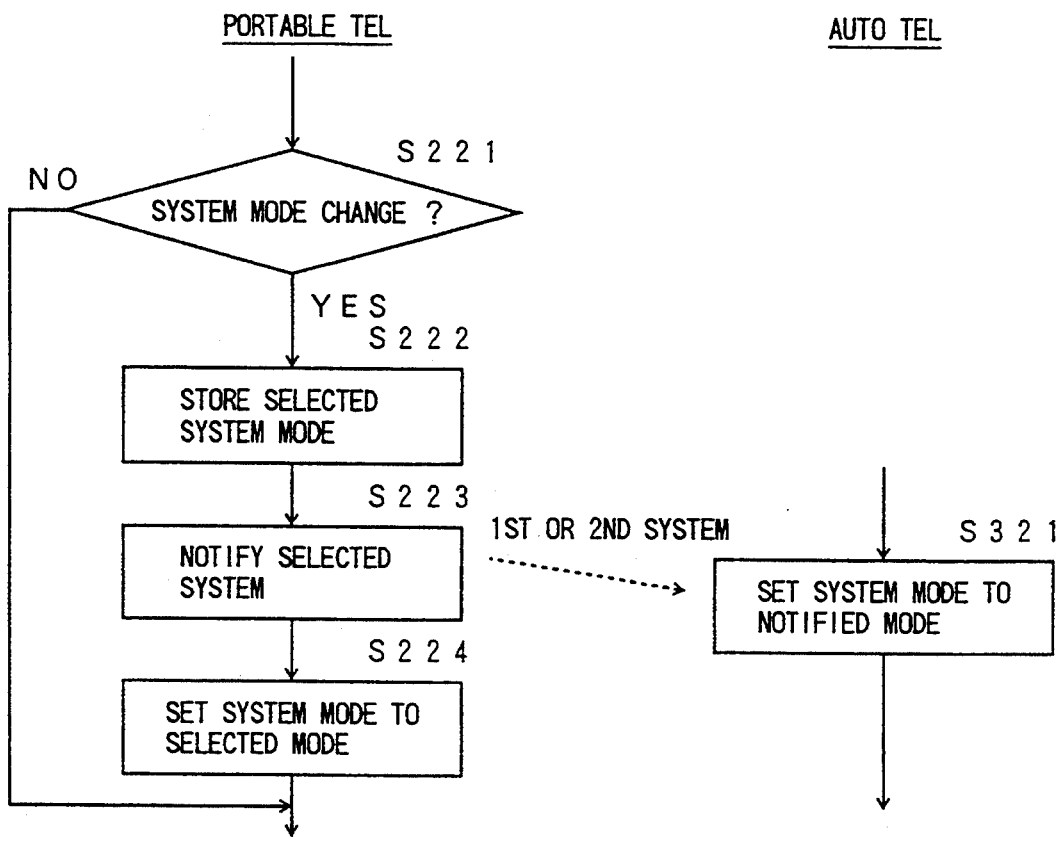

Next, a description will be given of the operation of the fourth embodiment when the selected system mode is changed (or switched), by referring to FIG. 18. In FIG. 18, the process of the portable telephone 710 (or 760) is shown on the left hand side, and the process of the automobile telephone 730 (or 780) is shown on the right hand side.

In FIG. 18, the CPU 711 of the portable telephone 710 (or 760) decides whether or not a system mode change instruction is received from the user or the like in a step S221. The process continues the normal operation of the portable telephone 710 (or 760) if the decision result in the step S221 is NO.

On the other hand, if the decision result in the step S221 is YES, the CPU 711 stores the selected system mode which is instructed by the instruction into the EEPROM 714, for example, in a step S222. Then, the CPU 711 notifies the selected system mode to the automobile telephone 730 (or 780) in a step S223. Next, the CPU 711 sets the portable telephone 710 (or 760) to the selected system mode in a step S224 by appropriately controlling the connections of the switches and the like of the portable telephone 710 (or 760), and the process continues to the normal operation of the portable telephone 710 (or 760).

In the automobile telephone 730 (or 780), the CPU 731 sets the automobile telephone 730 (or 780) to the selected system mode which is notified from the portable telephone 710 (or 760) in a step S321 by appropriately controlling the connections of the switches and the like within the automobile telephone 730 (or 780). Thereafter, the process continues the normal operation of the automobile telephone 730 (or 780). The CPU 731 sets the selected system mode when the step S223 is carried out in the portable telephone 710 (or 760) to notify the selected system mode.

Of course, in the embodiments described above, the communication system to which the portable telephone can originally communicate and the communication system to which the automobile telephone can originally communicate may be mutually different or may be the same. In other words, in the case of the fourth embodiment, for example, the first and second communication systems may be mutually different communication systems or may be the same communication system.

Further, the present invention is not limited to these embodiments, but various variations and modifications may be made without departing from the scope of the present invention.

What is claimed is:

1. A mobile telephone unit comprising:
   a portable mobile telephone comprising a respective connector and operating under a set of communication conditions which includes a radio frequency and service conditions;
   a communication unit operating under a set of communication conditions which includes a radio frequency and service conditions and is different from the set of communication conditions of the portable mobile telephone, the communication unit comprising an external connection terminal, a radio transmitter/receiver, a baseband processor, a communication controller which controls the set of communication conditions of the communication unit, and a handset; and
   a buffer unit which mounts the portable mobile telephone and comprising
      a first buffer unit connector which is connectable to the external connection terminal of the communication unit to electrically connect the buffer unit to the communication unit,
      a second buffer unit connector which is connectable to the connector of the portable mobile telephone mounted on the buffer unit to electrically connect the buffer unit to the portable mobile telephone,
      identifying means for identifying a communication condition of the set of communication conditions of the portable mobile telephone mounted on the buffer unit, and control signal transmitting means for transmitting the communication condition identified by the identifying means to the communication controller of the communication unit, wherein the communication controller is responsive to the transmitted communication condition to adjust the set of communication conditions of the communication unit to allow the portable mobile telephone mounted on the buffer unit to communicate through the communication unit.

2. The mobile telephone unit as claimed in claim 1, wherein portable mobile telephones having different, respective shapes are mountable on the buffer unit to allow a plurality of kinds of portable mobile telephones to be electrically connectable to the communication unit via the buffer unit.

3. The mobile telephone unit as claimed in claim 1, wherein the communication unit forms a part of a vehicle telephone, and the portable mobile telephone mounted on the buffer unit communicates through the vehicle telephone via the buffer unit.

4. The mobile telephone unit as claimed in claim 3, wherein the communication unit communicates using a subscriber's number of the portable mobile telephone mounted on the buffer unit, based on the communication condition transmitted by the control signal. transmitting means of the buffer unit.

5. The mobile telephone unit as claimed in claim 1, wherein:
the portable mobile telephone further comprises a storage device which stores a subscriber's number of the portable mobile telephone,
the buffer unit further comprises a storage device, and
the control signal transmitting means comprises means for transferring the subscriber's number stored in the storage device of the portable mobile telephone into the storage device of the buffer unit and for automatically transferring the subscriber's number stored in the storage device of the buffer unit to the communication controller of the communication unit when the portable mobile telephone is mounted on the buffer unit and the buffer unit is connected to the communication unit.

6. The mobile telephone unit as claimed in claim 1, wherein the communication unit further comprises a battery for supplying power to the radio transmitter/receiver, the baseband processor and the communication controller of the communication unit, and the buffer unit further comprises means for supplying power from the battery to the portable mobile telephone when the portable mobile telephone is mounted on the buffer unit and the buffer unit is electrically connected to the communication unit.

7. The mobile telephone unit as claimed in claim 1, wherein the second buffer unit connector of the buffer unit is connectable, at the same time, to the respective connectors of a plurality of portable mobile telephones.

8. A mobile telephone unit comprising:
a portable mobile telephone capable of communicating with a first communication system;
a vehicle telephone comprising
control circuit means for communicating with a second communication system, the first communication system being independent from the second communication system,
modem circuit means for communicating with the second communication system, and
transmitter/receiver circuit means for communicating with one of either the first communication system and the second communication system;
signal line interface means for exchanging data and audio signals between said portable mobile telephone and the control circuit means of the vehicle telephone and between the portable mobile telephone and the modem circuit means of the vehicle telephone; and
radio frequency interface means for exchanging radio frequency signals between the portable mobile telephone and the transmitter/receiver circuit means of the vehicle telephone, wherein
the portable mobile telephone comprises an antenna, a man-machine interface for allowing a person to interact with the portable mobile telephone through at least one of voice and input data, a baseband circuit, a modem circuit, a transmitter/receiver circuit, a first switch and a second switch, the first switch coupling the man-machine interface to the baseband circuit and the modem circuit or to the signal line interface means, the second switch coupling the transmitter/receiver circuit to the antenna when using the portable mobile telephone by itself and to the radio frequency interface means when using the portable mobile telephone coupled to the vehicle telephone, and
the vehicle telephone further comprises a switch for coupling the transmitter/receiver circuit means to the control circuit means and the modem circuit means or to the radio frequency interface means.

9. The mobile telephone unit as claimed in claim 8, wherein:
when the portable mobile telephone is electrically coupled to the vehicle telephone and the mobile telephone unit communicates with the first communication system, the baseband circuit, the modem circuit and the transmitter/receiver circuit of the portable mobile telephone are active, the first switch couples the man-machine interface to the baseband circuit and the modem circuit within the portable mobile telephone, the transmitter/receiver circuit means of the vehicle telephone is active and the third switch couples the transmitter/receiver circuit means to the radio frequency interface means; and
when the portable mobile telephone is electrically coupled to the vehicle telephone and the mobile telephone unit communicates with the second communication system, the man-machine interface within the portable mobile telephone is active, the first switch couples the man-machine interface to the signal line interface means, the control circuit means, the modem circuit means and the transmitter/receiver circuit means within the vehicle telephone are active and the third switch couples the control circuit means and the modem circuit means within the vehicle telephone to the transmitter/receiver circuit means.

* * * * *

UNITED STATES PATENT AND TRADEMARK OFFICE
CERTIFICATE OF CORRECTION

PATENT NO. : 5,450,471
DATED : September 12, 1995
INVENTOR(S) : Tetsuya HANAWA, et al.

It is certified that error appears in the above-indentified patent and that said Letters Patent is hereby corrected as shown below:

Column 1, line 24, delete "there are demands" and insert therefor --it would be advantageous--.
Column 2, line 66, after "result", insert a comma (",").
Column 18, lines 4 (first occurrence), 28, 61 and 63, delete "a", and insert therefor --$\underline{a}$--;
  Lines 5, 10, 29 and 62, delete "b" and insert therefor --$\underline{b}$--.
Column 19, lines 35 and 36, delete "b" and insert therefor --$\underline{b}$--.
Column 23, line 28, after "signal", delete the period (".").

Signed and Sealed this

Twenty-third Day of April, 1996

Attest:

BRUCE LEHMAN

Attesting Officer

Commissioner of Patents and Trademarks